US011990027B2

(12) United States Patent
Gish et al.

(10) Patent No.: US 11,990,027 B2
(45) Date of Patent: May 21, 2024

(54) GENERATING ALERTS BASED ON CONNECTION STATUS BY CONDUCTED ELECTRICAL WEAPONS

(71) Applicant: Axon Enterprise, Inc., Scottsdale, AZ (US)

(72) Inventors: Michael E. Gish, Scottsdale, AZ (US); Patrick W. Smith, Scottsdale, AZ (US); Varun Sathyanarayan, Phoenix, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 17/902,763

(22) Filed: Sep. 2, 2022

(65) Prior Publication Data

US 2023/0092622 A1 Mar. 23, 2023

Related U.S. Application Data

(60) Provisional application No. 63/247,253, filed on Sep. 22, 2021.

(51) Int. Cl.

| | |
|---|---|
| ***F41H 13/00*** | (2006.01) |
| ***G08B 7/06*** | (2006.01) |
| ***G08B 15/00*** | (2006.01) |
| ***G08B 25/10*** | (2006.01) |

(52) U.S. Cl.

CPC ........... *G08B 7/06* (2013.01); *F41H 13/0012* (2013.01); *F41H 13/0018* (2013.01); *F41H 13/0025* (2013.01); *G08B 15/005* (2013.01); *G08B 25/10* (2013.01)

(58) Field of Classification Search

CPC ............. F41H 13/0018; F41H 13/0025; F41H 13/0012; G08B 15/005

See application file for complete search history.

(56) References Cited

U.S. PATENT DOCUMENTS 5,193,048 A * 3/1993 Kaufman ................ H05C 3/00 361/232

7,600,337 B2 10/2009 Nerheim et al.

(Continued)

FOREIGN PATENT DOCUMENTS

| | | |
|---|---|---|
| CN | 101410689 A | 4/2009 |
| TW | 200726954 A | 7/2007 |
| WO | 2021144762 A1 | 7/2021 |

OTHER PUBLICATIONS

Taiwan Patent Office, Office Action for Taiwanese Application No. 111135932 dated Jun. 26, 2023.

(Continued)

*Primary Examiner* — John A Tweel, Jr.

(74) *Attorney, Agent, or Firm* — Andrew Graham

(57) ABSTRACT

A conducted electrical weapon ("CEW") may deploy electrodes toward a target to electrically couple to the target. The CEW may be configured to detect a connection status of at least one electrode of the deployed electrodes. A positive connection status represents a connection being established between the at least one electrode and the target. The CEW may generate an alert in accordance with the connection status. The alert may comprise one or more of an audible alert, a haptic alert, or a visual alert.

20 Claims, 16 Drawing Sheets

(56) References Cited

U.S. PATENT DOCUMENTS

| | | | | | |
|---|---|---|---|---|---|
| 7,631,452 | B1 * | 12/2009 | Brundula | F41A 17/063 | 361/232 |
| 7,944,676 | B2 * | 5/2011 | Smith | H05C 1/06 | 42/70.11 |
| 9,395,147 | B2 * | 7/2016 | Gagnon | F41B 15/04 | |
| 9,518,727 | B1 * | 12/2016 | Markle | F21V 23/0414 | |
| 10,496,957 | B2 * | 12/2019 | Dimino, Jr. | G06Q 90/00 | |
| 11,118,871 | B2 * | 9/2021 | Heroor | F41H 13/0025 | |
| 11,619,471 | B2 * | 4/2023 | Smith | F41H 13/0025 | 340/531 |
| 2005/0033397 | A1 * | 2/2005 | Aisenbrey | A61N 1/0456 | 607/142 |
| 2006/0256498 | A1 * | 11/2006 | Smith | F41H 13/0031 | 361/232 |
| 2012/0262293 | A1 * | 10/2012 | Brave | H05C 1/04 | 361/232 |
| 2013/0208392 | A1 | 8/2013 | Brundula et al. | | |
| 2014/0167954 | A1 * | 6/2014 | Johnson | H04W 76/10 | 340/539.11 |
| 2020/0149846 | A1 | 5/2020 | Nerheim et al. | | |
| 2021/0080231 | A1 | 3/2021 | Nerheim | | |
| 2021/0223004 | A1 | 7/2021 | Smith et al. | | |

OTHER PUBLICATIONS

Korean Intellectual Property Office, International Search Report for International for Application No. PCT/US2022/044455 dated Oct. 27, 2023.

Taiwan Intellectual Property Office, Allowance Decision of Examination for Taiwan Application No. 111135932 mailed Dec. 26, 2023.

* cited by examiner

400

| | E0 | E1 | E2 | E3 |
|---|---|---|---|---|
| 420 | - | - | - | + |
| 422 | - | - | + | - |
| 424 | - | - | + | + |
| 426 | - | + | - | - |
| 428 | - | + | - | + |
| 430 | - | + | + | - |
| 432 | - | + | + | + |
| 434 | + | - | - | - |
| 436 | + | - | - | + |
| 438 | + | - | + | - |
| 440 | + | - | + | + |
| 442 | + | + | - | - |
| 444 | + | + | - | + |
| 446 | + | + | + | - |

FIG. 4

500

| | E0 | E1 | E2 | E3 |
|---|---|---|---|---|
| 520 | + | - | Z | Z |
| 522 | + | Z | - | Z |
| 524 | + | Z | Z | - |
| 526 | - | + | Z | Z |
| 528 | Z | + | - | Z |
| 530 | Z | + | Z | - |
| 532 | - | Z | + | Z |
| 534 | Z | - | + | Z |
| 536 | Z | Z | + | - |
| 538 | - | Z | Z | + |
| 540 | Z | - | Z | + |
| 542 | Z | Z | - | + |

FIG. 5

| en | sel | A | B | Out |
|---|---|---|---|---|
| 0 | X | X | X | hi-Z |
| 1 | 0 | A | B | B |
| 1 | 1 | A | B | A |

| sel1 | sel0 | A | B | C | Out |
|---|---|---|---|---|---|
| 0 | 0 | A | B | C | A |
| 0 | 1 | A | B | C | B |
| 1 | X | A | B | A | C |

| sel1 | sel0 | A | B | C | D | Out |
|---|---|---|---|---|---|---|
| 0 | 0 | A | B | C | D | A |
| 0 | 1 | A | B | C | D | B |
| 1 | 0 | A | B | C | D | C |
| 1 | 1 | A | B | C | D | D |

1100

| | 1102 | | | | 1104 | | 1106 | | | | 1108 | |
|---|---|---|---|---|---|---|---|---|---|---|---|---|
| | selA1 | selA0 | selB1 | selB0 | A | B | selC1 | selC0 | selD1 | selD0 | C | D |
| 1130 | 0 | 1 | 1 | 1 | VHP | VHN | 0 | 0 | 0 | 0 | VHN | VHP |
| 1132 | 0 | 1 | 1 | 1 | VHP | VHN | 0 | 1 | 0 | 1 | VHP | VHN |
| 1134 | 0 | 1 | 1 | 1 | VHP | VHN | 0 | 0 | 0 | 0 | VHN | VHP |
| 1136 | 0 | 1 | 1 | 1 | VHP | VHN | 0 | 1 | 0 | 1 | VHP | VHN |
| 1138 | 0 | 1 | 1 | 1 | VHP | VHN | 0 | 1 | 0 | 1 | VHP | VHN |
| 1140 | 0 | 1 | 1 | 1 | VHP | VHN | 0 | 0 | 0 | 0 | VHN | VHP |

| | 1110 | | | | 1112 | | | | 1114 | | | |
|---|---|---|---|---|---|---|---|---|---|---|---|---|
| | enE0 | enE1 | enE2 | enE3 | selC1 | selC0 | selD1 | selD0 | E0 | E1 | E2 | E3 |
| 1130 | 1 | 1 | 0 | 0 | 1 | 0 | X | X | VHN | VHP | Z | Z |
| 1132 | 1 | 1 | 1 | 1 | 1 | 0 | 0 | 0 | VHP | VHN | VHN | VHN |
| 1134 | 1 | 0 | 0 | 1 | 1 | X | X | 0 | VHN | Z | Z | VHN |
| 1136 | 1 | 1 | 1 | 1 | 0 | 1 | 1 | 0 | VHN | VHP | VHP | VHN |
| 1138 | 0 | 1 | 1 | 0 | X | 1 | 0 | X | Z | VHP | VHN | Z |
| 1140 | 0 | 1 | 1 | 0 | X | 1 | 0 | X | Z | VHN | VHP | Z |

| | 1116 |
|---|---|
| 1130 | 526 |
| 1132 | 434 |
| 1134 | 538 |
| 1136 | 430 |
| 1138 | 528 |
| 1140 | 534 |

FIG. 11

| sel | A | B | C | D | O1 | O0 |
|---|---|---|---|---|---|---|
| 0 | A | B | C | D | C | A |
| 1 | A | B | C | D | D | B |

| sel | A | B | O |
|---|---|---|---|
| 0 | A | B | A |
| 1 | A | B | B |

1500

| | 1502 | | | 1504 | | | 1506 | | | 1508 | |
|---|---|---|---|---|---|---|---|---|---|---|---|
| | selAB | A | B | selH | HA | HB | selCD | C | D | sel01 | sel23 |
| 1530 | 0 | VHN | VHP | 0 | VHN | VHP | 0 | VHP | VHN | 0 | 0 |
| 1532 | 0 | VHN | VHP | 0 | VHN | VHP | 0 | VHP | VHN | 0 | 0 |
| 1534 | 0 | VHN | VHP | 0 | VHN | VHP | 0 | VHP | VHN | 0 | 0 |
| 1536 | 0 | VHN | VHP | 0 | VHN | VHP | 0 | VHP | VHN | 0 | 0 |
| 1538 | 0 | VHN | VHP | 0 | VHN | VHP | 0 | VHP | VHN | 0 | 1 |
| 1540 | 0 | VHN | VHP | 0 | VHN | VHP | 0 | VHP | VHN | 0 | 1 |

| | 1510 | | | | 1512 | | | | 1514 | | | | |
|---|---|---|---|---|---|---|---|---|---|---|---|---|---|
| | PE0 | PE1 | PE2 | PE3 | sel0 | sel1 | sel2 | sel3 | E0 | E1 | E2 | E3 | 1516 |
| 1530 | VHN | VHP | VHN | VHP | 0 | 0 | 1 | 1 | VHN | VHP | Z | Z | 526 |
| 1532 | VHN | VHP | VHN | VHP | 0 | 1 | 1 | 0 | VHN | Z | Z | VHP | 538 |
| 1534 | VHN | VHP | VHN | VHP | 1 | 0 | 0 | 1 | Z | VHP | VHN | Z | 528 |
| 1536 | VHN | VHP | VHN | VHP | 1 | 1 | 0 | 0 | Z | Z | VHN | VHP | 542 |
| 1538 | VHN | VHP | VHP | VHN | 0 | 1 | 0 | 1 | VHN | Z | VHP | Z | 532 |
| 1540 | VHN | VHP | VHP | VHN | 1 | 0 | 1 | 0 | Z | VHP | Z | VHN | 530 |

FIG. 15

1600

| | 1502 | | | 1504 | | | 1506 | | | 1508 | |
|---|---|---|---|---|---|---|---|---|---|---|---|
| | selAB | A | B | selH | HA | HB | selCD | C | D | sel01 | sel23 |
| 1630 | 1 | VTN | VTP | 0 | VTN | VTP | 0 | VTP | VTN | 0 | 0 |
| 1632 | 1 | VTN | VTP | 0 | VTN | VTP | 0 | VTP | VTN | 0 | 0 |
| 1634 | 1 | VTN | VTP | 0 | VTN | VTP | 0 | VTP | VTN | 0 | 0 |
| 1636 | 1 | VTN | VTP | 0 | VTN | VTP | 0 | VTP | VTN | 0 | 0 |
| 1638 | 1 | VTN | VTP | 0 | VTN | VTP | 0 | VTP | VTN | 0 | 1 |
| 1640 | 1 | VTN | VTP | 0 | VTN | VTP | 0 | VTP | VTN | 0 | 1 |

| | 1510 | | | | 1512 | | | | 1514 | | | | |
|---|---|---|---|---|---|---|---|---|---|---|---|---|---|
| | PE0 | PE1 | PE2 | PE3 | sel0 | sel1 | sel2 | sel3 | E0 | E1 | E2 | E3 | 1516 |
| 1630 | VTN | VTP | VTN | VTP | 0 | 0 | 1 | 1 | VTN | VTP | Z | Z | 526 |
| 1632 | VTN | VTP | VTN | VTP | 0 | 1 | 1 | 0 | VTN | Z | Z | VTP | 538 |
| 1634 | VTN | VTP | VTN | VTP | 1 | 0 | 0 | 1 | Z | VTP | VTN | Z | 528 |
| 1636 | VTN | VTP | VTN | VTP | 1 | 1 | 0 | 0 | Z | Z | VTN | VTP | 542 |
| 1638 | VTN | VTP | VTN | VTP | 0 | 1 | 0 | 1 | VTN | Z | VTP | Z | 532 |
| 1640 | VTN | VTP | VTN | VTP | 1 | 0 | 1 | 0 | Z | VTP | Z | VTN | 530 |

FIG. 16

1700

| | 1502 | | | 1504 | | | 1506 | | | 1508 | |
|---|---|---|---|---|---|---|---|---|---|---|---|
| | selAB | A | B | Hbridge | HA | HB | selCD | C | D | sel01 | sel23 |
| 1730 | X | X | X | 0 | X | X | 1 | Vlow | Vhigh | 0 | 0 |
| 1732 | X | X | X | 0 | X | X | 1 | Vlow | Vhigh | 0 | 0 |
| 1734 | X | X | X | 0 | X | X | 1 | Vlow | Vhigh | 0 | 0 |
| 1736 | X | X | X | 0 | X | X | 1 | Vlow | Vhigh | 0 | 0 |
| 1738 | X | X | X | 0 | X | X | 1 | Vlow | Vhigh | 0 | 1 |
| 1740 | X | X | X | 0 | X | X | 1 | Vlow | Vhigh | 0 | 1 |

| | 1510 | | | | 1512 | | | | 1514 | | | | |
|---|---|---|---|---|---|---|---|---|---|---|---|---|---|
| | PE0 | PE1 | PE2 | PE3 | sel0 | sel1 | sel2 | sel3 | E0 | E1 | E2 | E3 | 1516 |
| 1730 | Vhigh | Vlow | Vhigh | Vlow | 0 | 0 | 1 | 1 | Vhigh | Vlow | Z | Z | 526 |
| 1732 | Vhigh | Vlow | Vhigh | Vlow | 0 | 1 | 1 | 0 | Vhigh | Z | Z | Vlow | 538 |
| 1734 | Vhigh | Vlow | Vhigh | Vlow | 1 | 0 | 0 | 1 | Z | Vlow | Vhigh | Z | 528 |
| 1736 | Vhigh | Vlow | Vhigh | Vlow | 1 | 1 | 0 | 0 | Z | Z | Vhigh | Vlow | 542 |
| 1738 | Vhigh | Vlow | Vlow | Vhigh | 0 | 1 | 0 | 1 | Vhigh | Z | Vlow | Z | 532 |
| 1740 | Vhigh | Vlow | Vlow | Vhigh | 1 | 0 | 1 | 0 | Z | Vlow | Z | Vhigh | 530 |

FIG. 17

1800

| | 1102 | | | | 1104 | | 1106 | | | | 1108 | |
|---|---|---|---|---|---|---|---|---|---|---|---|---|
| | selA1 | selA0 | selB0 | selB1 | A | B | selC1 | selC0 | selD1 | selD0 | C | D |
| 1830 | X | X | X | X | X | X | 1 | 0 | 1 | 0 | Vlow | Vhigh |
| 1832 | X | X | X | X | X | X | 1 | 0 | 1 | 0 | Vlow | Vhigh |
| 1834 | 1 | 0 | 0 | 0 | VTN | VTP | 0 | 1 | 0 | 1 | VTN | VTP |
| 1836 | 1 | 0 | 0 | 0 | VTN | VTP | 0 | 0 | 0 | 0 | VTP | VTN |

| | 1110 | | | | 1112 | | | |
|---|---|---|---|---|---|---|---|---|
| | enE0 | enE1 | enE2 | enE3 | selE0 | selE1 | selE2 | selE3 |
| 1830 | 1 | 0 | 0 | 1 | 0 | X | X | 1 |
| 1832 | 0 | 1 | 1 | 0 | X | 1 | 0 | X |
| 1834 | 1 | 0 | 1 | 0 | 0 | X | 0 | X |
| 1836 | 0 | 1 | 0 | 1 | X | 1 | X | 0 |

| | 1114 | | | | 1116 |
|---|---|---|---|---|---|
| | E0 | E1 | E2 | E3 | |
| 1830 | Vhigh | Z | Z | Vlow | 524 |
| 1832 | Z | Vlow | Vhigh | Z | 532 |
| 1834 | VTN | Z | VTP | Z | 530 |
| 1836 | Z | VTP | Z | VTN | 534 |

FIG. 18

ELECTRODES

| | E0 | E1 | E2 |
|---|---|---|---|
| PULSE 1 | - | + | |
| PULSE 2 | | - | + |
| PULSE 3 | + | | - |
| PULSE n | ... | ... | ... |

2000

ELECTRODES

| | E0 | E1 | E2 | E3 | E4 |
|---|---|---|---|---|---|
| TEST 1 | **FIRST V** | ~FIRST V | **SECOND V** | 0 | ~SECOND V |
| TEST 2 | ~FIRST V | **FIRST V** | ~SECOND V | 0 | **SECOND V** |
| TEST 3 | ~SECOND V | ~SECOND V | **FIRST V** | 0 | **SECOND V** |
| TEST 4 | SECOND V | **SECOND V** | SECOND V | **FIRST V** | SECOND V |

GENERATING ALERTS BASED ON CONNECTION STATUS BY CONDUCTED ELECTRICAL WEAPONS

CROSS-REFERENCE TO RELATED APPLICATIONS

This application claims the benefit of U.S. Provisional Application 63/247,253, filed Sep. 22, 2021, which is incorporated by reference herein in its entirety.

FIELD OF INVENTION

Embodiments of the present invention relate to a conducted electrical weapon ("CEW") that launches electrodes to provide a stimulus signal through a human or animal target to impede locomotion of the target.

BRIEF DESCRIPTION OF THE SEVERAL VIEWS OF THE DRAWING

Embodiments of the present invention will be described with reference to the drawing, wherein like designations denote like elements, and:

FIG. 4 is a table of possible polarity assignments for the electrodes of FIG. 3, in accordance with various embodiments;

FIG. 5 is another table of possible polarity assignments for the electrodes of FIG. 3, in accordance with various embodiments;

FIG. 11 is a table of input and output values for delivering a stimulus signal using the selector circuit of FIG. 7, in accordance with various embodiments;

FIG. 15 is a diagram of input and output values for delivering a stimulus signal using the selector circuit of FIG. 12, in accordance with various embodiments;

FIG. 16 is a diagram of input and output values for delivering a test current using the selector circuit of FIG. 12, in accordance with various embodiments;

FIG. 17 is a diagram of input and output values for delivering a test voltage using the selector circuit of FIG. 12, in accordance with various embodiments;

FIG. 18 is a diagram of input and output values for delivering a test voltage using the selector circuit of FIG. 7, in accordance with various embodiments;

Figure 1:
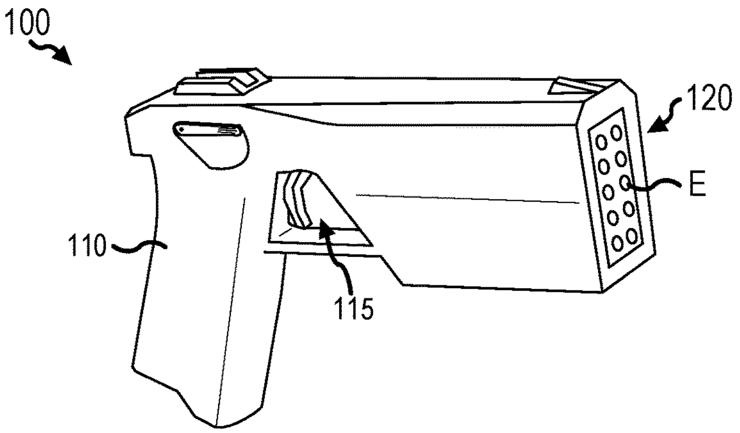
FIG. 1 is a perspective view of a conducted electrical weapon ("CEW"), in accordance with various embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF INVENTION

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

Systems, methods, and apparatuses may be used to interfere with voluntary locomotion (e.g., walking, running, moving, etc.) of a target. For example, a CEW may be used to deliver a current (e.g., stimulus signal, pulses of current, pulses of charge, etc.) through tissue of a human or animal target. Although typically referred to as a conducted electrical weapon, as described herein a "CEW" may refer to a conducted electrical weapon, a conducted energy weapon, and/or any other similar device or apparatus configured to provide a stimulus signal through one or more deployed projectiles (e.g., electrodes).

A stimulus signal carries a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion of the target.

A stimulus signal may be delivered through the target via terminals coupled to the CEW. Delivery via terminals may be referred to as a local delivery (e.g., a local stun, a drive stun, etc.). During local delivery, the terminals are brought close to the target by positioning the CEW proximate to the target. The stimulus signal is delivered through the target's tissue via the terminals. To provide local delivery, the user of the CEW is generally within arm's reach of the target and brings the terminals of the CEW into contact with or proximate to the target.

A stimulus signal may be delivered through the target via one or more (typically at least two) wire-tethered electrodes. Delivery via wire-tethered electrodes may be referred to as a remote delivery (e.g., a remote stun). During a remote delivery, the CEW may be separated from the target up to the length (e.g., 15 feet, 20 feet, 30 feet, etc.) of the wire tether. The CEW launches the electrodes towards the target. As the electrodes travel toward the target, the respective wire tethers deploy behind the electrodes. The wire tether electrically couples the CEW to the electrode. The electrode may electrically couple to the target thereby coupling the CEW to the target. In response to the electrodes connecting with, impacting on, or being positioned proximate to the target's tissue, the current may be provided through the target via the electrodes (e.g., a circuit is formed through the first tether and the first electrode, the target's tissue, and the second electrode and the second tether).

Terminals or electrodes that contact or are proximate to the target's tissue deliver the stimulus signal through the target. Contact of a terminal or electrode with the target's tissue establishes an electrical coupling (e.g., circuit) with the target's tissue. Electrodes may include a spear that may pierce the target's tissue to contact the target. A terminal or electrode that is proximate to the target's tissue may use ionization to establish an electrical coupling with the target's tissue. Ionization may also be referred to as arcing.

In use (e.g., during deployment), a terminal or electrode may be separated from the target's tissue by the target's clothing or a gap of air. In various embodiments, a signal generator of the CEW may provide the stimulus signal (e.g., current, pulses of current, etc.) at a high voltage (e.g., in the range of 40,000 to 100,000 volts) to ionize the air in the clothing or the air in the gap that separates the terminal or electrode from the target's tissue. Ionizing the air establishes a low impedance ionization path from the terminal or electrode to the target's tissue that may be used to deliver the stimulus signal into the target's tissue via the ionization path. The ionization path persists (e.g., remains in existence, lasts, etc.) as long as the current of a pulse of the stimulus signal is provided via the ionization path. When the current ceases or is reduced below a threshold (e.g., amperage, voltage), the ionization path collapses (e.g., ceases to exist) and the terminal or electrode is no longer electrically coupled to the target's tissue. Lacking the ionization path, the impedance between the terminal or electrode and target tissue is high. A high voltage in the range of about 50,000 volts can ionize air in a gap of up to about one inch.

A CEW may provide a stimulus signal as a series of current pulses. Each current pulse may include a high voltage portion (e.g., 40,000-100,000 volts) and a low voltage portion (e.g., 500-6,000 volts). The high voltage portion of a pulse of a stimulus signal may ionize air in a gap between an electrode or terminal and a target to electrically couple the electrode or terminal to the target. In response to the electrode or terminal being electrically coupled to the target, the low voltage portion of the pulse delivers an amount of charge into the target's tissue via the ionization path. In response to the electrode or terminal being electrically coupled to the target by contact (e.g., touching, spear embedded into tissue, etc.), the high portion of the pulse and the low portion of the pulse both deliver charge to the target's tissue. Generally, the low voltage portion of the pulse delivers a majority of the charge of the pulse into the target's tissue. In various embodiments, the high voltage portion of a pulse of the stimulus signal may be referred to as the spark or ionization portion. The low voltage portion of a pulse may be referred to as the muscle portion.

In various embodiments, a signal generator of the CEW may provide the stimulus signal (e.g., current, pulses of current, etc.) at only a low voltage (e.g., less than 2,000 volts). The low voltage stimulus signal may not ionize the air in the clothing or the air in the gap that separates the terminal or electrode from the target's tissue. A CEW having a signal generator providing stimulus signals at only a low voltage (e.g., a low voltage signal generator) may require deployed electrodes to be electrically coupled to the target by contact (e.g., touching, spear embedded into tissue, etc.).

A CEW may include at least two terminals at the face of the CEW. A CEW may include two terminals for each bay that accepts a cartridge. The terminals are spaced apart from each other. In response to the electrodes of the cartridge in the bay having not been deployed, the high voltage impressed across the terminals will result in ionization of the air between the terminals. The arc between the terminals may be visible to the naked eye. In response to a launched electrode not electrically coupling to a target, the current that would have been provided via the electrodes may arc across the face of the CEW via the terminals.

The likelihood that the stimulus signal will cause NMI increases when the electrodes that deliver the stimulus signal are spaced apart at least 6 inches (15.24 centimeters) so that the current from the stimulus signal flows through the at least 6 inches of the target's tissue. In various embodiments, the electrodes preferably should be spaced apart at least 12 inches (30.48 centimeters) on the target. Because the terminals on a CEW are typically less than 6 inches apart, a stimulus signal delivered through the target's tissue via terminals likely will not cause NMI, only pain.

A series of pulses may include two or more pulses separated in time. Each pulse delivers an amount of charge into the target's tissue. In response to the electrodes being appropriately spaced (as discussed above), the likelihood of inducing NMI increases as each pulse delivers an amount of charge in the range of 55 microcoulombs to 71 microcoulombs per pulse. The likelihood of inducing NMI increases when the rate of pulse delivery (e.g., rate, pulse rate, repetition rate, etc.) is between 11 pulses per second ("pps") and 50 pps. Pulses delivered at a higher rate may provide less charge per pulse to induce NMI. Pulses that deliver more charge per pulse may be delivered at a lesser rate to induce NMI. In various embodiments, a CEW may be hand-held and use batteries to provide the pulses of the stimulus signal. In response to the amount of charge per pulse being high and the pulse rate being high, the CEW may use more energy than is needed to induce NMI. Using more energy than is needed depletes batteries more quickly.

Empirical testing has shown that the power of the battery may be conserved with a high likelihood of causing NMI in response to the pulse rate being less than 44 pps and the charge per a pulse being about 63 microcoulombs. Empirical testing has shown that a pulse rate of 22 pps and 63 microcoulombs per a pulse via a pair of electrodes will induce NMI when the electrode spacing is at least 12 inches (30.48 centimeters).

In various embodiments, a CEW may include a handle and one or more magazines. The handle may include one or more bays for receiving the magazines. Each magazine may be removably positioned in (e.g., inserted into, coupled to, etc.) a bay. Each magazine may releasably electrically, electronically, and/or mechanically couple to a bay. A deployment of the CEW may launch one or more electrodes toward a target to remotely deliver the stimulus signal through the target.

In various embodiments, a magazine may receive one or more cartridges (e.g., deployment units, etc.). The magazine may comprise a respective bore in which each cartridge of the one or more cartridges may be received. The magazine may receive a cartridge of the cartridge(s) prior to and during use of the cartridge to provide a stimulus signal. The magazine may align the cartridge(s) with a housing of a CEW handle to enable respective use of each cartridge of the cartridge(s).

In various embodiments, a cartridge may include two or more electrodes that are launched at the same time. In various embodiments, a cartridge may include two or more electrodes that may be launched individually at separate times. In various embodiments, a cartridge may include a single electrode configured to be launched from the magazine. Launching the electrodes may be referred to as activating (e.g., firing) a cartridge. After use (e.g., activation, firing), a cartridge may be removed from the bay and replaced with an unused (e.g., not fired, not activated) cartridge to permit launch of additional electrodes.

Figure 2:
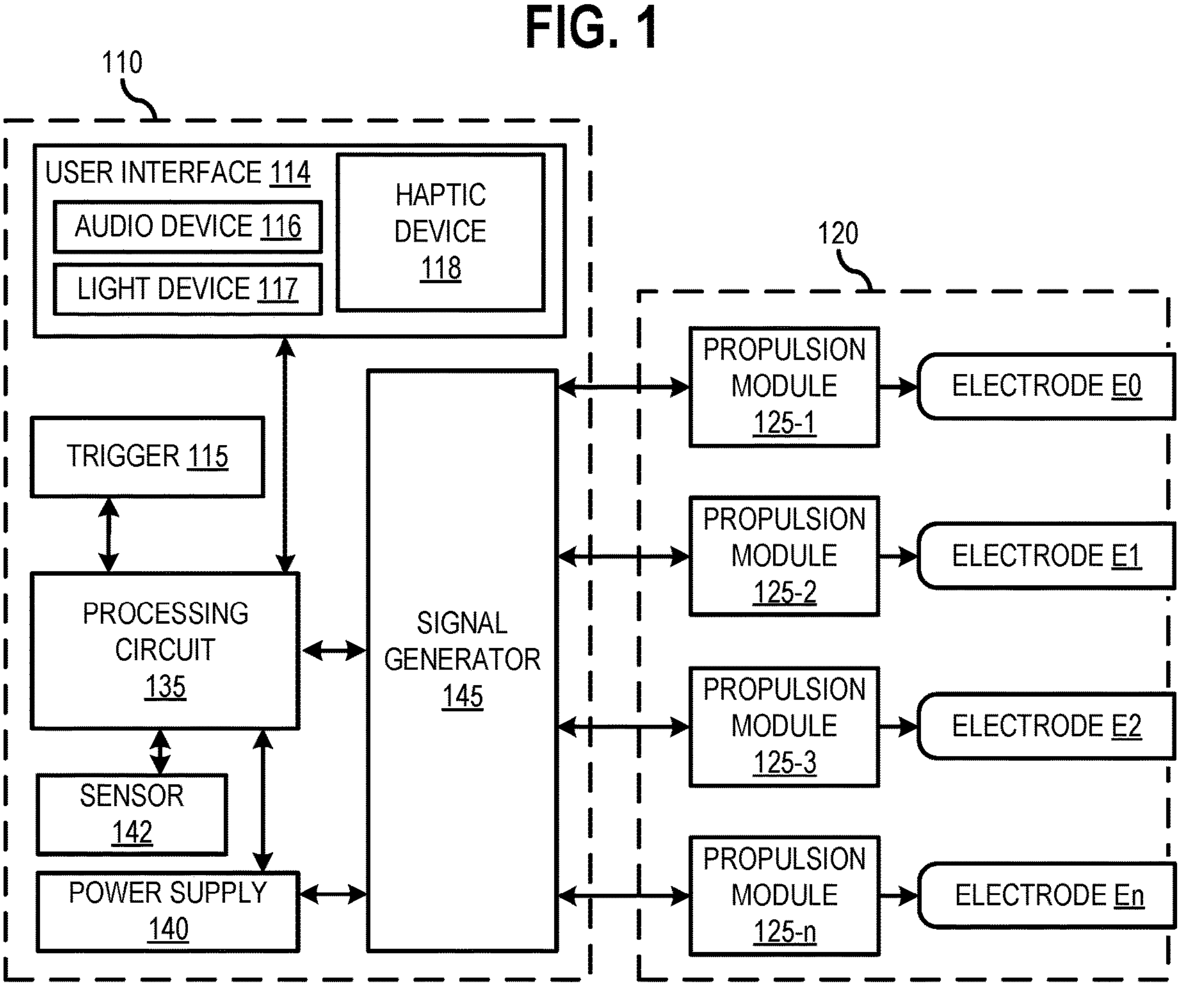
FIG. 2 is a schematic view of a CEW, in accordance with various embodiments.

In various embodiments, and with reference to FIGS. 1 and 2, a CEW 100 is disclosed. CEW 100 may be similar to, or have similar aspects and/or components with, any CEW discussed herein. CEW 100 may comprise a housing 110 and one or more cartridges 120 (e.g., deployment units). It should be understood by one skilled in the art that FIG. 2 is a schematic representation of CEW 100, and one or more of the components of CEW 100 may be located in any suitable position within, or external to, housing 110.

Housing 110 may be configured to house various components of CEW 100 that are configured to enable deployment of cartridges 120, provide an electrical current to cartridges 120, and otherwise aid in the operation of CEW 100, as discussed further herein. Although depicted as a firearm in FIG. 1, housing 110 may comprise any suitable shape and/or size. Housing 110 may comprise a handle end opposite a deployment end. A deployment end may be configured, and sized and shaped, to receive one or more cartridges 120. A handle end may be sized and shaped to be held in a hand of a user. For example, a handle end may be shaped as a handle to enable hand-operation of CEW 100 by the user. In various embodiments, a handle end may also comprise contours shaped to fit the hand of a user, for example, an ergonomic grip. A handle end may include a surface coating, such as, for example, a non-slip surface, a grip pad, a rubber texture, and/or the like. As a further example, a handle end may be wrapped in leather, a colored print, and/or any other suitable material, as desired.

In various embodiments, housing 110 may comprise various mechanical, electronic, and/or electrical components configured to aid in performing the functions of CEW 100. For example, housing 110 may comprise one or more triggers 115, control interfaces, processing circuits 135, power supplies 140, and/or signal generators 145. Housing 110 may include a guard (e.g., trigger guard). A guard may define an opening formed in housing 110. A guard may be located on a center region of housing 110 (e.g., as depicted in FIG. 1), and/or in any other suitable location on housing 110. Trigger 115 may be disposed within a guard. A guard may be configured to protect trigger 115 from unintentional physical contact (e.g., an unintentional activation of trigger 115). A guard may surround trigger 115 within housing 110.

In various embodiments, trigger 115 may be coupled to an outer surface of housing 110, and may be configured to move, slide, rotate, or otherwise become physically depressed or moved upon application of physical contact. For example, trigger 115 may be actuated by physical contact applied to trigger 115 from within a guard. Trigger 115 may comprise a mechanical or electromechanical switch, button, trigger, or the like. For example, trigger 115 may comprise a switch, a pushbutton, and/or any other suitable type of trigger. Trigger 115 may be mechanically and/or electronically coupled to processing circuit 135. In response to trigger 115 being activated (e.g., depressed, pushed, etc. by the user), processing circuit 135 may enable deployment of one or more cartridges 120 from CEW 100, as discussed further herein.

In various embodiments, power supply 140 may be configured to provide power to various components of CEW 100. For example, power supply 140 may provide energy for operating the electronic and/or electrical components (e.g., parts, subsystems, circuits, etc.) of CEW 100 and/or one or more cartridges 120. Power supply 140 may provide electrical power. Providing electrical power may include providing a current at a voltage. Power supply 40 may be electrically coupled to processing circuit 135 and/or signal generator 145. In various embodiments, in response to a control interface comprising electronic properties and/or components, power supply 140 may be electrically coupled to the control interface. In various embodiments, in response to trigger 115 comprising electronic properties or components, power supply 140 may be electrically coupled to trigger 115. Power supply 140 may provide an electrical current at a voltage. Electrical power from power supply 140 may be provided as a direct current ("DC"). Electrical power from power supply 140 may be provided as an alternating current ("AC"). Power supply 140 may include a battery. The energy of power supply 140 may be renewable or exhaustible, and/or replaceable. For example, power supply 140 may comprise one or more rechargeable or disposable batteries. In various embodiments, the energy from power supply 140 may be converted from one form (e.g., electrical, magnetic, thermal) to another form to perform the functions of a system.

Power supply 140 may provide energy for performing the functions of CEW 100. For example, power supply 140 may provide the electrical current to signal generator 145 that is provided through a target to impede locomotion of the target (e.g., via cartridge 120). Power supply 140 may provide the energy for a stimulus signal. Power supply 140 may provide the energy for other signals, including an ignition signal, as discussed further herein.

In various embodiments, processing circuit 135 may comprise any circuitry, electrical components, electronic components, software, and/or the like configured to perform various operations and functions discussed herein. For example, processing circuit 135 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processing circuit 135 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processing circuit 135 may include data buses, output ports, input ports, timers, memory, arithmetic units, and/or the like.

In various embodiments, processing circuit 135 may include signal conditioning circuitry. Signal conditioning circuitry may include level shifters to change (e.g., increase, decrease) the magnitude of a voltage (e.g., of a signal) before receipt by processing circuit 135 or to shift the magnitude of a voltage provided by processing circuit 135.

In various embodiments, processing circuit 135 may be configured to control and/or coordinate operation of some or all aspects of CEW 100. For example, processing circuit 135 may include (or be in communication with) memory configured to store data, programs, and/or instructions. The memory may comprise a tangible non-transitory computer-readable memory. Instructions stored on the tangible non-transitory memory may allow processing circuit 135 to perform various operations, functions, and/or steps, as described herein.

In various embodiments, the memory may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Processing circuit 135 may be configured to provide and/or receive electrical signals whether digital and/or analog in form. Processing circuit 135 may provide and/or receive digital information via a data bus using any protocol. Processing circuit 135 may receive information, manipulate the received information, and provide the manipulated information. Processing circuit 135 may store information and retrieve stored information. Information received, stored, and/or manipulated by processing circuit 135 may be used to perform a function, control a function, and/or to perform an operation or execute a stored program.

Processing circuit 135 may control the operation and/or function of other circuits and/or components of CEW 100. Processing circuit 135 may receive status information regarding the operation of other components, perform calculations with respect to the status information, and provide commands (e.g., instructions) to one or more other components. Processing circuit 135 may command another component to start operation, continue operation, alter operation, suspend operation, cease operation, or the like. Commands and/or status may be communicated between processing circuit 135 and other circuits and/or components via any type of bus (e.g., SPI bus) including any type of data/address bus.

In various embodiments, processing circuit 135 may be mechanically and/or electronically coupled to trigger 115. Processing circuit 135 may be configured to detect an activation, actuation, depression, input, etc. (collectively, an "activation event") of trigger 115. In response to detecting the activation event, processing circuit 135 may be configured to perform various operations and/or functions, as discussed further herein. Processing circuit 135 may also include a sensor (e.g., a trigger sensor) attached to trigger 115 and configured to detect an activation event of trigger 115. The sensor may comprise any suitable sensor, such as a mechanical and/or electronic sensor capable of detecting an activation event in trigger 115 and reporting the activation event to processing circuit 135.

In various embodiments, processing circuit 135 may be mechanically and/or electronically coupled to a control interface. Processing circuit 135 may be configured to detect an activation, actuation, depression, input, etc. (collectively, a "control event") of a control interface. In response to detecting the control event, processing circuit 135 may be configured to perform various operations and/or functions, as discussed further herein. Processing circuit 135 may also include a sensor (e.g., a control sensor) attached to a control interface and configured to detect a control event of the control interface. The sensor may comprise any suitable mechanical and/or electronic sensor capable of detecting a control event in the control interface and reporting the control event to processing circuit 135.

In various embodiments, processing circuit 135 may be electrically and/or electronically coupled to power supply 140. Processing circuit 35 may receive power from power supply 140. The power received from power supply 140 may be used by processing circuit 135 to receive signals, process signals, and transmit signals to various other components in CEW 100. Processing circuit 135 may use power from power supply 140 to detect an activation event of trigger 115, a control event of a control interface, or the like, and generate one or more control signals in response to the detected events. The control signal may be based on the control event and the activation event. The control signal may be an electrical signal.

In various embodiments, processing circuit 135 may be electrically and/or electronically coupled to signal generator 145. Processing circuit 135 may be configured to transmit or provide control signals to signal generator 145 in response to detecting an activation event of trigger 115. Multiple control signals may be provided from processing circuit 135 to signal generator 145 in series. In response to receiving the control signal, signal generator 145 may be configured to perform various functions and/or operations, as discussed further herein.

In various embodiments, signal generator 145 may be configured to receive one or more control signals from processing circuit 135. Signal generator 145 may provide an ignition signal to cartridge 120 based on the control signals. Signal generator 145 may be electrically and/or electronically coupled to processing circuit 135 and/or cartridge 120. Signal generator 145 may be electrically coupled to power supply 140. Signal generator 145 may use power received from power supply 140 to generate an ignition signal. For example, signal generator 145 may receive an electrical signal from power supply 140 that has first current and voltage values. Signal generator 145 may transform the electrical signal into an ignition signal having second current and voltage values. The transformed second current and/or the transformed second voltage values may be different from the first current and/or voltage values. The transformed second current and/or the transformed second voltage values may be the same as the first current and/or voltage values. Signal generator 145 may temporarily store power from power supply 140 and rely on the stored power entirely or in part to provide the ignition signal. Signal generator 145 may also rely on received power from power supply 140 entirely or in part to provide the ignition signal, without needing to temporarily store power.

Signal generator 145 may be controlled entirely or in part by processing circuit 135. In various embodiments, signal generator 145 and processing circuit 135 may be separate components (e.g., physically distinct and/or logically discrete). Signal generator 145 and processing circuit 135 may be a single component. For example, a control circuit within housing 110 may at least include signal generator 145 and processing circuit 135. The control circuit may also include other components and/or arrangements, including those that further integrate corresponding function of these elements into a single component or circuit, as well as those that further separate certain functions into separate components or circuits.

Signal generator 145 may be controlled by the control signals to generate an ignition signal having a predetermined current value or values. For example, signal generator 145 may include a current source. The control signal may be received by signal generator 145 to activate the current source at a current value of the current source. An additional control signal may be received to decrease a current of the current source. For example, signal generator 145 may include a pulse width modification circuit coupled between a current source and an output of the control circuit. A second control signal may be received by signal generator 145 to activate the pulse width modification circuit, thereby decreasing a non-zero period of a signal generated by the current source and an overall current of an ignition signal subsequently output by the control circuit. The pulse width modification circuit may be separate from a circuit of the current source or, alternatively, integrated within a circuit of the current source. Various other forms of signal generators 145 may alternatively or additionally be employed, including those that apply a voltage over one or more different resistances to generate signals with different currents. In various embodiments, signal generator 145 may include a high-voltage module configured to deliver an electrical current having a high voltage. In various embodiments, signal generator 145 may include a low-voltage module configured to deliver an electrical current having a lower voltage, such as, for example, 2,000 volts.

Responsive to receipt of a signal indicating activation of trigger 115 (e.g., an activation event), a control circuit provides an ignition signal to cartridge 120. For example, signal generator 145 may provide an electrical signal as an ignition signal to cartridge 120 in response to receiving a control signal from processing circuit 135. In various embodiments, the ignition signal may be separate and distinct from a stimulus signal. For example, a stimulus signal in CEW 100 may be provided to a different circuit within cartridge 120, relative to a circuit to which an ignition signal is provided. Signal generator 145 may be configured to generate a stimulus signal. In various embodiments, a second, separate signal generator, component, or circuit (not shown) within housing 110 may be configured to generate the stimulus signal. Signal generator 145 may also provide a ground signal path for cartridge 120, thereby completing a circuit for an electrical signal provided to cartridge 120 by signal generator 145. The ground signal path may also be provided to cartridge 120 by other elements in housing 110, including power supply 140.

In various embodiments, a bay of housing 110 may be configured to receive one or more cartridges 120. Bay of housing 110 may comprise an opening in an end of CEW handle sized and shaped to receive one or more cartridges 120. Bay of housing 110 may include one or more mechanical or electrical features configured to removably couple one or more cartridges 120 within bay of housing 110. For example, a bay of housing 110 may be configured to receive a single cartridge, two cartridges, three cartridges, nine cartridges, or any other number of cartridges.

A cartridge 120 may comprise one or more propulsion modules 125 and one or more electrodes E. For example, a cartridge 120 may comprise a single propulsion module 125 configured to deploy a single electrode E. As a further example, a cartridge 120 may comprise a single propulsion module 125 configured to deploy a plurality of electrodes E. As a further example, a cartridge 120 may comprise a plurality of propulsion modules 125 and a plurality of electrodes E, with each propulsion module 125 configured to deploy one or more electrodes E. In various embodiments, and as depicted in FIG. 2, cartridge 120 may comprise a first propulsion module 125-1 configured to deploy a first electrode E0, a second propulsion module 125-2 configured to deploy a second electrode E1, a third propulsion module 125-3 configured to deploy a third electrode E2, and a fourth propulsion module **125-*n*** configured to deploy a fourth electrode En. Each series of propulsion modules and electrodes may be contained in the same and/or separate cartridges.

In various embodiments, a propulsion module 125 may be coupled to, or in communication with one or more electrodes E in cartridge 120. In various embodiments, cartridge 120 may comprise a plurality of propulsion modules 125, with each propulsion module 125 coupled to, or in communication with, one or more electrodes E. A propulsion module 125 may comprise any device, propellant (e.g., air, gas, etc.), primer, or the like capable of providing a propulsion force in cartridge 120. The propulsion force may include an increase in pressure caused by rapidly expanding gas within an area or chamber. The propulsion force may be applied to one or more electrodes E in cartridge 120 to cause the deployment of the one or more electrodes E. A propulsion module 125 may provide the propulsion force in response to cartridge 120 receiving an ignition signal, as previously discussed.

In various embodiments, the propulsion force may be directly applied to one or more electrodes E. For example, a propulsion force from propulsion module 125-1 may be provided directly to first electrode E0. A propulsion module 125 may be in fluid communication with one or more electrodes E to provide the propulsion force. For example, a propulsion force from propulsion module 125-1 may travel within a housing or channel of cartridge 120 to first electrode E0. The propulsion force may travel via a manifold in cartridge 120.

In various embodiments, the propulsion force may be provided indirectly to one or more electrodes E. For example, the propulsion force may be provided to a secondary source of propellant within propulsion module 125. The propulsion force may launch the secondary source of propellant within propulsion module 125, causing the secondary source of propellant to release propellant. A force associated with the released propellant may in turn provide a force to one or more electrodes E. A force generated by a secondary source of propellant may cause the one or more electrodes E to be deployed from the cartridge 120 and CEW 100.

In various embodiments, each electrode E0, E1, E2, En may comprise any suitable type of projectile. For example, one or more electrodes E may be or include a projectile, an electrode (e.g., an electrode dart), or the like. An electrode may include a spear portion, designed to pierce or attach proximate a tissue of a target in order to provide a conductive electrical path between the electrode and the tissue, as previously discussed herein.

A control interface of CEW 100 may comprise, or be similar to, any control interface disclosed herein. In various embodiments, a control interface may be configured to control selection of firing modes in CEW 100. Controlling selection of firing modes in CEW 100 may include disabling firing of CEW 100 (e.g., a safety mode, etc.), enabling firing of CEW 100 (e.g., an active mode, a firing mode, an escalation mode, etc.), controlling deployment of cartridges 120, and/or similar operations, as discussed further herein.

A control interface may be located in any suitable location on or in housing 110. For example, a control interface may be coupled to an outer surface of housing 110. A control interface may be coupled to an outer surface of housing 110 proximate trigger 115 and/or a guard of housing 110. A control interface may be electrically, mechanically, and/or electronically coupled to processing circuit 135. In various embodiments, in response to a control interface comprising electronic properties or components, the control interface may be electrically coupled to power supply 140. The control interface may receive power (e.g., electrical current) from power supply 140 to power the electronic properties or components.

A control interface may be electronically or mechanically coupled to trigger 115. For example, and as discussed further herein, a control interface may function as a safety mechanism. In response to the control interface being set to a "safety mode," CEW 100 may be unable to launch electrodes from cartridge 120. For example, the control interface may provide a signal (e.g., a control signal) to processing circuit 135 instructing processing circuit 135 to disable deployment of electrodes from cartridge 120. As a further example, the control interface may electronically or mechanically prohibit trigger 115 from activating (e.g., prevent or disable a user from depressing trigger 115; prevent trigger 115 from launching an electrode; etc.).

A control interface may comprise any suitable electronic or mechanical component capable of enabling selection of firing modes. For example, a control interface may comprise a fire mode selector switch, a safety switch, a safety catch, a rotating switch, a selection switch, a selective firing mechanism, and/or any other suitable mechanical control. As a further example, a control interface may comprise a slide, such as a handgun slide, a reciprocating slide, or the like. As a further example, a control interface may comprise a touch screen or similar electronic component.

The safety mode may be configured to prohibit deployment of an electrode from cartridge 120 in CEW 100. For example, in response to a user selecting the safety mode, the control interface may transmit a safety mode instruction to processing circuit 135. In response to receiving the safety mode instruction, processing circuit 135 may prohibit deployment of an electrode from cartridge 120. Processing circuit 135 may prohibit deployment until a further instruction is received from the control interface (e.g., a firing mode instruction). As previously discussed, a control interface may also, or alternatively, interact with trigger 115 to prevent activation of trigger 115. In various embodiments, the safety mode may also be configured to prohibit deployment of a stimulus signal from signal generator 145, such as, for example, a local delivery.

The firing mode may be configured to enable deployment of one or more electrodes from cartridge 120 in CEW 100. For example, and in accordance with various embodiments, in response to a user selecting the firing mode, a control interface may transmit a firing mode instruction to processing circuit 135. In response to receiving the firing mode instruction, processing circuit 135 may enable deployment of an electrode from cartridge 120. In that regard, in response to trigger 115 being activated, processing circuit 135 may cause the deployment of one or more electrodes. Processing circuit 135 may enable deployment until a further instruction is received from a control interface (e.g., a safety mode instruction). As a further example, and in accordance with various embodiments, in response to a user selecting the firing mode, the control interface may also mechanically (or electronically) interact with trigger 115 of CEW 100 to enable activation of trigger 115.

In various embodiments, CEW 100 may comprise user interface 114. User interface 114 may be in electronic communication with processing circuit 135. User interface 114 may also be in electrical and/or electronic communication with power supply 140. User interface 114 may comprise a standalone component in CEW 100, either partially or wholly, or may be at least partially or wholly integrated into another component of CEW 100, such as processing circuit 135.

User interface 114 may be configured to output an alert in response to CEW 100 detecting an event or event type. The event or event type may be detected by processing circuit 135. For example, the event or event type may comprise a connection status for one or more electrodes E and/or removal of CEW 100 from a holster in accordance with various aspects of the present disclosure. In various embodiments, the alert may indicate whether a stimulus signal may be remotely delivered to a target from CEW 100. For example, the alert may provide notice to a user that CEW 100 has been removed from a holster and/or is electrically coupled to a target via two or more electrodes E. While shown as a separate element in FIG. 2, user interface 114 may comprise and/or perform the functions of trigger 115 and/or a control interface.

In embodiments, user interface 114 may comprise one or more alert devices configured to provide an alert to a user of CEW 100. An alert device may comprise one or more hardware and/or software components configured to generate and output the alert. The alert may include an audio output, visual output, and/or haptic output from CEW 100. User interface 114 may comprise hardware and/or software components configured to generate and output an audio output, visual output, and/or haptic output. For example, and in accordance with various embodiments, user interface may comprise one or more of an audio device 116, a visual or light device 117, and/or a haptic feedback device or haptic device 118. The alert device may be disposed on an interior or exterior surface of the CEW. The alert device may receive information from processing circuit 135 to cause an alert to be generated. Processing circuit 135 may provide one or more control signals to alert device(s) of user interface 114 to cause the alert to be generated. Audio device 116, light device 117, and/or a haptic device 118 may comprise separate components and/or systems or may at least partially or wholly include the same components and/or systems. For example, audio device 116, light device 117, and/or a haptic device 118 may comprise separate processing circuits and/or logic, the same processing circuits and/or logic, and/or may rely on processing circuit 135 to provide processing power and/or logic.

In accordance with various embodiments, processing circuit 135 may be configured to control and/or coordinate operation of some or all aspects of an alert device of user interface 114. Processing circuit 135 may include (or be in communication with) memory configured to store data, programs, and/or instructions. The memory may comprise a tangible non-transitory computer-readable memory. Instructions stored on the tangible non-transitory memory may allow processing circuit 135 to perform various operations, functions, and/or steps, as described herein. For example, in response to processing circuit 135 executing the instructions on the tangible non-transitory memory, processing circuit 135 may communicate with an alert device of user interface 114 to output an alert (e.g., a visual output, haptic output, and/or an audio output). In various embodiments, processing circuit 135 may execute the instructions in response to operation of a control interface and/or trigger 115 of CEW 100.

A light device 117 may be configured to generate and/or output a visual output (e.g., a visual alert, a visual output alert, etc.). For example, the visual output may comprise an emitted light. Light device 117 may comprise one or more components configured to emit light. Light device 117 may comprise, for example, one or more light emitting components, flashlights, laser modules, and/or light emitting diodes (LEDs). The components may be arranged in a suitable manner for providing the visual output. The components may comprise individual light emitting components (e.g., an individual light, etc.), collective light emitting components (e.g., a light bar, a light strip, etc.), and/or a combination thereof. Alternately or additionally, the visual output may comprise a reflected light. For example, light device 117 may comprise an electrophoretic or other mechanical display by which the visual output may be provided via reflecting light.

In various embodiments, the light emitted by light device 117 may comprise one or more colored lights. For example, light device 117 may comprise an LED configured to emit a colored light. As a further example, one or more of the light emitting components of light device 117 may comprise a color filter configured to filter the emitted light into a desired color. The colored light may be configured to indicate an individual detected event among a plurality of detectable events to a user of CEW 100.

In various embodiments, light device 117 may emit the light based on a light emitting characteristic (e.g., a visual output characteristic). The light emitting characteristic may define characteristics of one or more of the light emitting components of light device 117. For example, a light emitting characteristic may define an emitting color (e.g., for light emitting components capable of emitting lights in more than one color). A light emitting characteristic may define an emitting time (e.g., a visual output time, a visual emitting time, etc.). The emitting time may define a period of time that one or more light emitting components in light device 117 emit light (e.g., 1 second, 2 seconds, 3 seconds, 5 seconds, 10 seconds, etc.). In various embodiments, the emitting time may be defined by the period of time between which a most recent electrode of electrodes E was deployed from CEW 100 and a next electrode is deployed from CEW 100 (e.g., light device 117 may emit light while a connection status associated with the most recently deployed electrode of electrodes E). In various embodiments, the emitting time may be defined by an audio output time and/or haptic output time (e.g., a visual output time may be the same as an audio output time and/or haptic output time).

In embodiments, a light emitting characteristic may define an emitting pattern. The emitting pattern may define how one or more light emitting components in light device 117 emit light. For example, the emitting pattern may define a continuous light emission, a strobing (e.g., non-continuous, etc.) light emission, or the like. The emitting pattern may also define an emitting order. The emitting order may define an order that one or more of the light emitting components of light device 117 are configured to output light. In various embodiments, the emitting pattern may define a connection status pattern configured to identify whether one or more deployed electrodes are electrically coupled to a target. The connection status pattern may visually distinguish different connection statuses and/or different numbers of electrodes that are or are not electrically coupled to a target. For example, light emitting components of light device 117 may be configured to increase in brightness as an increasing number of deployed electrodes are electrically coupled to a target. Alternately or additionally, the light emitting components of light device 117 may emit light when one or more electrodes are electrically coupled to the target and/or not emit light when one or more electrodes are not electrically coupled to the target.

Instructions controlling light device 117 (e.g., visual output instructions) may be stored in memory and executed by a processor (e.g., processing circuit 135), as previously discussed. The instructions may include one or more light emitting characteristics. In various embodiments, one or more light emitting characteristics may also be defined by physical characteristics and/or firmware of one or more light emitting components of light device 117.

Audio device 116 may be configured to generate and/or output an audio output (e.g., an audio alert, an audio output alert, etc.). For example, the audio output may comprise sounds including speech, music, tones, prerecorded sounds, or other types of audio output. Audio device 116 may comprise one or more components configured to generate and/or output audio such as, for example, audio generating components (e.g., discrete soundcards, integrated soundcards, processors, processing circuits, integrated circuits, amplifier, etc.), audio output components (e.g., speakers), and/or the like.

Audio device 116 may be configured to output the audio output from (or through) an exterior surface of CEW 100. For example, audio device 116 may be configured to output the audio output from a grip end of CEW 100 proximate a user of CEW 100. In that regard, audio device 116 may be at least partially located proximate a grip end of CEW 100 opposite a deployment end of CEW 100 from which one or more electrodes E may be deployed. For example, a speaker of audio device 116 may be located on a grip end of CEW 100. As a further example, a speaker of audio device 116 may be located at any other exterior surface position on a CEW whereby a user of the CEW may perceive the audio output. As a further example, a speaker of audio device 116 may be located at an internal location within CEW 100 and configured to output an audio output from CEW 100 at a sufficient intensity that a user of CEW 100 may perceive the audio output.

The audio output may comprise a frequency and intensity perceivable by a human's auditory system. For example, research has shown that a human can generally perceive sounds in a frequency range of about 20 Hz to about 20 kHz (with the upper range decreasing as a human ages). Audio outputs having an intensity between 0 dB and about 90 dB are generally considered safe for the human ear, and audio outputs having an intensity above about 90 dB may cause damage to a human's inner ear. The dynamic range of audio intensities safe for human perception may vary based on the frequency of the audio output. In that respect, the audio output may be tailored to comprise a frequency perceivable by a human and an intensity safe for human perception (e.g., to protect the user operating the CEW).

In various embodiments, audio device 116 may output a suitable or desired audio output, or series of audio outputs. An audio output may comprise a sound or alert sound. The sound may comprise any audio output configured to indicate a status of CEW 100 to a user of CEW 100. For example, the alert sound may comprise a horn sound, a siren sound, a beeping sound, and/or the like. An audio output may differ in accordance with a detected status of CEW 100. For example, the sound may be output at greater intensities in accordance with an increasing number of electrodes that are detected to be electrically coupled to a target. An audio output may comprise a speech output. The speech output may be configured to alert a user of CEW 100 regarding the event detected by CEW 100. For example, the speech output may comprise speech configured to provide the alert (e.g., "Connected", "Two!", "Two electrodes coupled!", "Three electrodes coupled", etc.). The speech output may comprise prerecorded speech. For example, the prerecorded speech may comprise a digital audio file comprising human speech (or machine speech, using a text-to-speech service). The prerecorded speech may be stored in memory in audio device 116, user interface 114, processing circuit 135, and/or another component in CEW 100.

In various embodiments, audio device 116 may output the audio output based on an audio output characteristic. The audio output characteristic may define characteristics or properties of the audio output. An audio output characteristic may define an output time (e.g., an audio output time). The output time may define a period of time that audio device 116 outputs the audio output (e.g., 1 second, 2 seconds, 3 seconds, 5 seconds, 10 seconds, etc.). In various embodiments, the output time may be defined by the period of time during which one or more connection statuses are detected by processing circuit 135.

An audio output characteristic may define an output pattern (e.g., an audio output pattern). The output pattern may define an order that one or more audio outputs are output in, in response to audio device 116 being activated. In various embodiments, each audio output in the output pattern may comprise a defined audio output time (e.g., a first audio output is associated with a first audio output time, a second audio output is associated with a second audio output time, etc.). An audio output characteristic may define an output intensity (e.g., an audio output intensity, an audio volume, etc.). In various embodiments, each audio output in an output pattern may comprise a defined audio output intensity (e.g., a first audio output is associated with a first audio output intensity, a second audio output is associated with a second audio output intensity, etc.). Different audio outputs or audible alerts may comprise different audio output intensities and/or output patterns. In embodiments, different audio output characteristics may enable a number of electrodes electrically coupled to a target to be auditorily distinguished.

In various embodiments, the output pattern may define a first output indicating that the CEW is not electrically coupled to a target and a subsequent output (e.g., second output, third output, etc.) indicating that one or more electrodes deployed from the CEW are coupled to the target. In some embodiments, the first output pattern may comprise a zero and/or low audio output intensity. The subsequent output pattern may comprise a non-zero audio intensity. Further, the subsequent output pattern may comprise different non-zero intensities for different numbers of electrodes detected to be electrically coupled to a target.

Instructions controlling audio device 116 (e.g., audio output instructions) may be stored in memory and executed by a processor (e.g., processing circuit 135), as previously discussed. The instructions may include one or more audio output characteristics. In various embodiments, one or more audio output characteristics may also be defined by physical characteristics and/or firmware of one or more components of audio device 116.

In various embodiments, the audio output time may be the same as the visual output time and/or a haptic output time. In various embodiments, the audio output time may be different from the visual output time and/or haptic output time (e.g., the audio output time may be shorter or longer than the visual output time and/or haptic output time).

Haptic device 118, also referred to herein as a haptic feedback device, may be configured to generate and/or output a haptic output (e.g., a haptic alert, a haptic feedback alert, a haptic output alert, etc.). For example, the haptic output may comprise vibration, motions, or other contact forces that are applied a user physically coupled to CEW 100. Haptic device 118 may comprise one or more components configured to generate and/or output haptic feedback such as, for example, eccentric rotating masses, piezoelectric actuators, linear resonant actuators, servomotors, haptic drivers, and/or haptic actuators.

Haptic device 118 may be configured to output the haptic output from or through an exterior surface of CEW 100. For example, haptic device 118 may be configured to output the haptic output at a surface of a grip end of CEW 100 proximate a user of CEW 100. In that regard, haptic device 118 may be at least partially located proximate a grip end of CEW 100 opposite a deployment end of CEW 100. For example, an actuator of haptic device 118 may be coupled to a surface of a grip end of CEW 100. As a further example, an actuator of haptic device 118 may be located at any other exterior surface position on a CEW whereby a user of the CEW may perceive the haptic output. As a further example, an actuator of haptic device 118 may be located at an internal location within CEW 100 and configured to output a haptic output from CEW 100 at a sufficient intensity that a user of CEW 100 may perceive the haptic output.

The haptic output may comprise a frequency and intensity perceptible by a human somatosensory system. For example, a frequency of a haptic output may be between 1 and 1000 hertz. In embodiments, different haptic alerts may comprise haptic outputs having different frequencies and/or intensities.

In various embodiments, haptic device 118 may output a suitable or desired haptic output, or series of haptic outputs. A haptic output may comprise a pulse of vibration. A series of haptic outputs may comprise a series of continuous or intermittent vibrational pulses. A haptic output may differ in accordance with a detected status of CEW 100. For example, the haptic output may be provided at a greater intensity and/or a greater duration in accordance with an increasing number of electrodes that are detected to be electrically coupled to a target.

In various embodiments, haptic device 118 may output the haptic output based on a haptic output characteristic. The haptic output characteristic may define characteristics or properties of the haptic output. A haptic output characteristic may define an output time (e.g., a haptic output time). The output time may define a period of time that haptic device 118 outputs the haptic output (e.g., 1 second, 2 seconds, 3 seconds, 5 seconds, 10 seconds, etc.). In various embodiments, the output time may be defined by the period of time during which one or more connection statuses are detected by processing circuit 135. In various embodiments, the output time may be defined by the emitting time (e.g., a haptic output time may be the same as a visual output time and/or audio output time). In embodiments, different haptic output characteristics may enable a number of electrodes electrically coupled to a target to be distinguished via a human tactile system.

A haptic output characteristic may define an output pattern (e.g., a haptic output pattern). The output pattern may define an order that one or more audio outputs are output in, in response to haptic device 118 being activated. In various embodiments, each haptic output in the output pattern may comprise a defined haptic output time (e.g., a first haptic output is associated with a first haptic output time, a second haptic output is associated with a second haptic output time, etc.). A haptic output characteristic may define an output intensity (e.g., a haptic output intensity, a haptic volume, etc.). In various embodiments, each haptic output in a haptic pattern may comprise a defined haptic output intensity (e.g., a first haptic output is associated with a first haptic output intensity, a second haptic output is associated with a second haptic output intensity, etc.). Different haptic outputs or haptic alerts may comprise different haptic output intensities and/or output patterns.

In various embodiments, the output pattern may define a first output indicating that the CEW is not electrically coupled to a target and a subsequent output (e.g., second output, third output, etc.) indicating that one or more electrodes deployed from the CEW are coupled to the target. In some embodiments, the first output pattern may comprise a zero and/or low haptic output intensity. The subsequent output pattern may comprise a non-zero haptic output intensity. Further, the subsequent output pattern may comprise different non-zero intensities for different numbers of electrodes detected to be electrically coupled to a target.

Instructions controlling haptic device 118 (e.g., haptic output instructions) may be stored in memory and executed by a processor (e.g., processing circuit 135), as previously discussed. The instructions may include one or more haptic output characteristics. In various embodiments, one or more haptic output characteristics may also be defined by physical characteristics and/or firmware of one or more components of haptic device 118.

In various embodiments, the haptic output time may be the same as the visual output time and/or the audio output time. In various embodiments, the haptic output time may be different from the visual output time and/or audio output time (e.g., the haptic output time may be shorter or longer than the visual output time and/or audio output time).

In some embodiments, and in response to an event, alert devices of user interface 114 may be activated in any order. For example, and in accordance with various embodiments, audio device 116, light device 117, and/or haptic device 118 may be activated at the same time such that user interface 114 emits a visual output, audio output, and haptic output at a same time. Alternately or additionally, different combinations of alert devices of user interface 114 may be activated in accordance with different events. For example, only light device 117 of the alert devices of user interface 114 may be activated responsive to detection of two electrodes being electrically coupled to a target, while both light device 117 and audio device 116 may be activated in accordance with three electrodes being detected to be electrically coupled to the target. In various embodiments, CEW 100 may comprise a sensor configured to detect removal of CEW 100 from a holster. For example, CEW 100 may comprise sensor 142. Sensor 142 may be in electronic communication with processing circuit 135. Sensor 142 may also be in electrical and/or electronic communication with power supply 40. Sensor 142 may comprise a standalone component in CEW 100, either partially or wholly, or may be at least partially or wholly integrated into another component of CEW 100, such as processing circuit 135. Sensor 142 may comprise a gyroscope or other sensor configured to detect movement, direction of movement, and/or velocity of movement by the CEW 100. Alternately or additionally, sensor 142 may comprise a Hall effect sensor or proximity sensor configured to detect proximity to holster or other item having magnetic elements. In another example, sensor 142 may comprise one or more communications interfaces. The communications interface(s) may enable WI-FI, BLUETOOTH, or other long- or short-distance wireless communications to other entities, configured to interact with other entities within a given proximity, e.g., a smart watch. In another example, sensor 142 may comprise a fingerprint sensor or other sensor configured to detect touch on a portion, e.g., a handle, or all of the CEW 100. Sensor 142 and/or processing circuit 135 may process detected information to detect CEW 100 has been removed from a provided holster. Responsive to detecting removal of CEW 100 from the provided holster, processing circuit 135 may be configured to perform one or more operations to provide an alert, including as further disclosed herein.

In various embodiments, a CEW may deliver a stimulus signal via a circuit that includes a signal generator positioned in the handle of the CEW. An interface (e.g., cartridge interface) on each cartridge inserted into the handle electrically couples to an interface (e.g., handle interface) in the handle. The signal generator couples to each cartridge, and thus to the electrodes, via the handle interface and the cartridge interface. A first filament couples to the interface of the cartridge and to a first electrode. A second filament couples to the interface of the cartridge and to a second electrode. The stimulus signal travels from the signal generator, through the first filament and the first electrode, through target tissue, and through the second electrode and second filament back to the signal generator.

In various embodiments, while providing the stimulus signal (e.g., one pulse of the stimulus signal), the signal generator provides the stimulus signal at a first voltage to the first electrode, via the first filament, and at a second voltage to the second electrode via the second filament. The voltage difference across the first electrode and the second electrode applies a voltage potential across the target. The voltage potential across target tissue delivers charge into and through target tissue. The charge through target tissue impedes locomotion of the target.

The voltage potential applied across the first electrode and the second electrode may have the same polarity, but have different magnitudes. For example, +1,000 volts may be applied to the first electrode and +100 volts to the second electrode. In another example, −1,000 volts may be applied to the first electrode and −100 volts to the second electrode.

The voltage applied to the first electrode and the second electrode may have different polarities and/or different magnitudes. For example, +1,000 volts may be applied to the first electrode and −1,000 volts to the second electrode. In another example, +1,000 volts may be applied to the first electrode and −500 volts to the second electrode.

Herein, a common voltage (e.g., zero volts, ground) may be considered to have either a positive polarity or a negative polarity. For example, applying +1,000 volts to the first electrode and zero volts to the second electrode may be considered applying voltages at the same or different potentials.

In some CEWs, the polarity assigned to an electrode is predetermined and cannot be changed. In such CEWs, the polarity of an electrode is determined by the connection between the cartridge and the CEW and the connection cannot be modified.

In the present disclosure, electrode polarity may be assigned (e.g., changed, flipped, varied, etc.). Electrode polarity may be assigned prior to launching the electrodes. Electrode polarity may be assigned after launching the electrodes. Electrode polarity may be assigned at one moment in time and change at another moment in time (e.g., assigned a first polarity at a first time and a second polarity at a second time). For example, and in accordance with various embodiments, the polarity of the electrodes launched toward a target is assigned after launching the electrodes. In another implementation, the polarity of the electrodes is assigned after the electrodes are launched toward the target and tested for connectivity with the target. Testing may include applying a test voltage (e.g., high voltage, one pulse of stimulus signal) to all possible combinations of at least two electrodes launched toward the target. After determining which electrodes electrically couple to the target, a polarity may be assigned to two or more electrodes and the stimulus signal provide via the selected electrodes.

Polarity may be assigned when two or more electrodes are launched. When only two electrodes are launched, each launched electrode is assigned a polarity and must cooperate to provide the stimulus signal through the target.

Polarity may be assigned when three or more electrodes are launched. When three or more electrodes are launched, two electrodes may be selected to provide the stimulus signal through target tissue. Any two of the three or more launched electrodes may be selected. A polarity may be assigned to the two electrodes that cooperate to provide the stimulus signal. The polarities assigned to the two electrodes may change. A first polarity assignment (e.g., first electrode positive, second electrode negative) may be changed to a second polarity assignment (e.g., first electrode negative, second electrode positive).

A polarity may be assigned to three or more electrodes. The voltage potential of the stimulus signal may be applied over three or more electrodes. Three or more electrodes may be assigned a plurality of polarity assignments. For example, a first polarity assignment may assign a positive polarity to a first electrode and a negative polarity to the other electrodes. A second polarity assignment may assign a negative polarity to a first electrode and a positive polarity to the other electrodes. The stimulus signal may be provided concurrently through two or more electrodes in accordance with a given polarity assignment. Providing the stimulus signal through three or more electrodes, regardless of polarity assignments, decreases the current density of the current that flows through each circuit formed through target tissue by the three or more electrodes.

Figure 3:
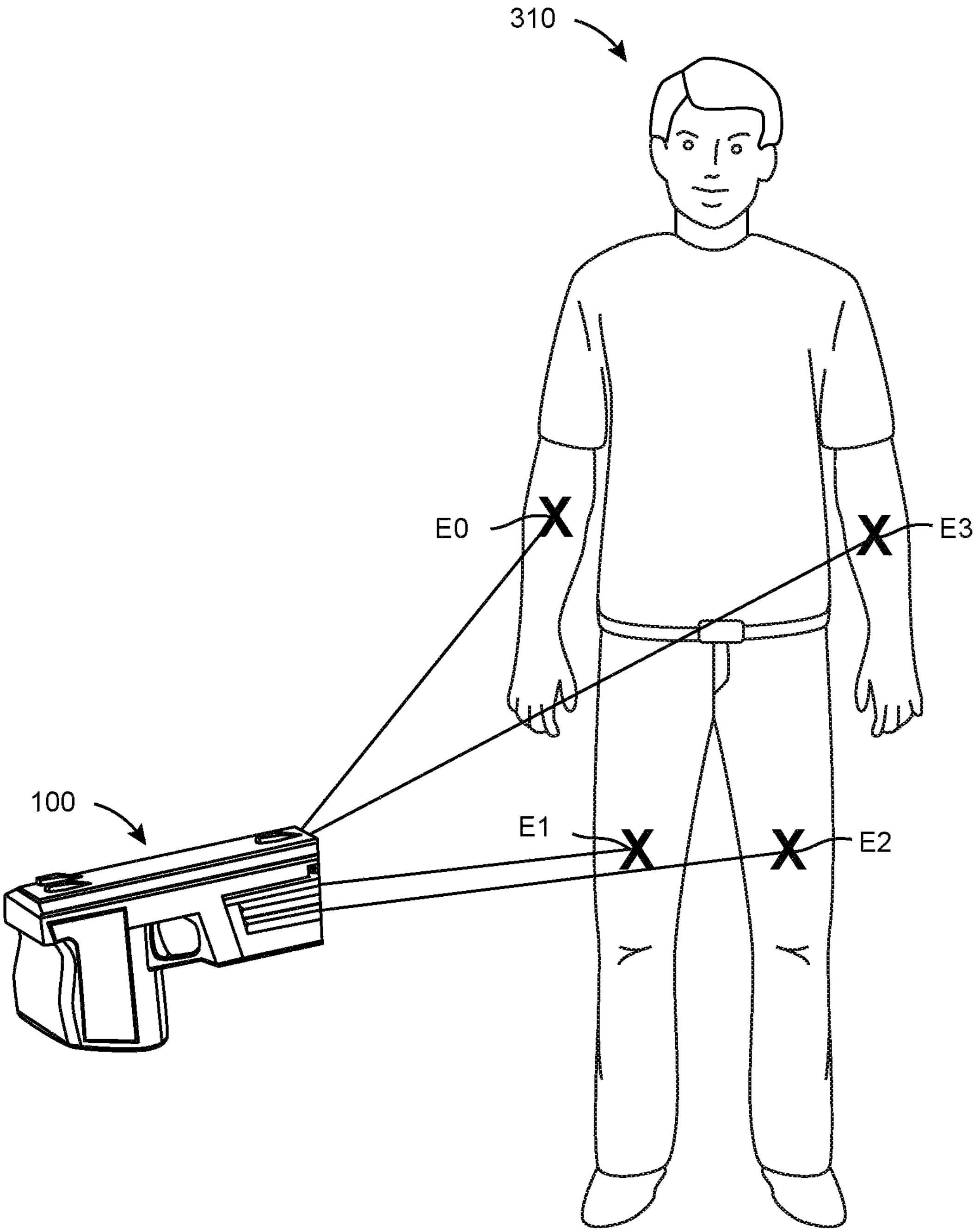
FIG. 3 is a view of electrodes deployed from a CEW, in accordance with various embodiments.

In an example of assigning polarity, referring to FIG. 3 and in accordance with various embodiments, four electrodes E0, E1, E2, and E3 have been launched from CEW 100 and electrically couple to a target 310. The CEW may assign any polarity (e.g., positive, negative) to any of the four electrodes. The CEW may also disconnect (e.g., tri-state) any electrode to break the circuit between the CEW and the target. For example, CEW 100 may assign a positive polarity to electrode E0, a negative polarity to electrode E1, and disconnect electrode E2 and electrode E3. A signal generator in the CEW provides each pulse of a stimulus signal to establish a voltage potential across electrodes E0 and E1. Because electrode E0 has been assigned a positive polarity, high positive voltage (VHP) is applied to electrode E0. High negative voltage (VHN) is applied to E1 because it has been assigned the negative polarity. The voltage potential between VHP and VEIN delivers a pulse of current through the target to interfere with locomotion of the target. In an implementation, VHP is +2,500 volts and VHN is −2,500 volts there by providing a voltage potential of 5,000 volts between VHP and VHN. The current induced by the voltage potential flows through target tissue between electrodes E0 and E1.

In another example of assigning polarity, and in accordance with various embodiments, electrode E3 is assigned a positive polarity, electrodes E0 and E2 are assigned a negative polarity, and electrode E1 is disconnected. In this example, the signal generator in the CEW applies VHP to electrode E3 and VHN to electrodes E0 and E2. The current induced by the voltage potential flows through target tissue through two circuits. One circuit is the circuit formed by electrodes E3 and E0. The other circuit is the circuit formed by electrodes E3 and E2. Because the current flows through two circuits, as to one circuit discussed above, the current density through each circuit is less than the current density through a single circuit. Reducing the current density may reduce the likelihood of causing NMI.

The ability to assign any polarity to any electrode increases the likelihood of being able to deliver the stimulus signal through a target. If the polarities of the electrodes are fixed (e.g., cannot be changed) and all darts of the same polarity miss the target, then no stimulus signal may be delivered to the target because no circuit may be formed. Being able to assign polarities means that a stimulus signal may be delivered through a target as long as any two electrodes electrically couple to the target. For example, a CEW may launch six electrodes and have four electrodes miss the target entirely. The stimulus signal may still be delivered to the target through the two electrodes that hit (e.g., electrically coupled with) the target because different polarities may be assigned to the two electrodes to enable formation of a circuit.

As discussed above, a CEW may test launched electrodes to determine whether they are electrically coupled to a target. Using the results of the testing, the CEW may select two or more electrodes to deliver the stimulus signal. In various embodiments, the connectivity of an electrode may be tested by observing a voltage at the target or a current that flows through the target via the electrodes under test.

In various embodiments, testing using a voltage includes at least three launched electrodes. A test voltage is applied across target tissue via two electrodes and the other electrodes are observing (e.g., tested, read) to see if they detect a voltage. For example, a voltage VHIGH may be applied to a first launched electrode and VLOW to a second launched electrode. The voltage potential between VHIGH and VLOW is dropped across target tissue. If the other electrodes are between or near the first and second electrodes, they may detect a voltage as it drops across target tissue. The voltage that may be detected at the other electrodes may be said to be induced by VHIGH and VLOW.

For example, VHIGH may be 15 volts and VLOW 5 volts. If a voltage detected on any of the other electrodes is between VHIGH and VLOW, then that electrode is electrically coupled to the target. If an electrode is not coupled to the target, no voltage will be induced on that electrode and its voltage will be measured as zero volts.

In various embodiments, testing by observing a current uses two launched electrodes. A capacitor of the CEW is charged. The voltage across the capacitor is applied across the two launched electrodes. If the electrodes are electrically coupled to the target, the capacitor will discharge. If one of the selected electrodes is not coupled to the target, the capacitor does not discharge. All pairs of launched electrodes may be tested to determine which electrodes are electrically coupled to the target.

As shown in FIG. 3, CEW 100 has launched four electrodes, electrodes E0, E1, E2, and E3, toward target 310. Electrodes E0-E3 may be any four of the possible electrodes deployable from a CEW (e.g., CEW 100, with brief reference to FIG. 1 and FIG. 2). Any polarity may be assigned to electrodes E0-E3, as discussed above. The connectivity of electrodes E0-E3 to target 102 may be tested as discussed above. A stimulus signal may be provided by (e.g., via) any two or more electrodes of electrodes E0-E3 to impede locomotion of target 310.

Although FIG. 3 shows only four electrodes and the examples and circuits discussed herein may show only four electrodes, the methods and circuits disclosed herein are suitable for any number of electrodes.

Row 420 of table 400 shows the case in which electrode E3 is assigned a positive polarity and electrodes E0-E2 are all assigned negative polarities. Assuming that electrodes E0-E3 are all electrically coupled to target 310, the current of the stimulus signal provided by the signal generator of CEW 100 will divide between the circuits formed by electrodes E3/E0, electrodes E3/E1 and electrodes E3/E2. The current will flow from electrode E3 and depending on the resistance of target 310, a first portion (e.g., of charge, current) will flow into electrode E0, a second portion into electrode E1, and a third portion into electrode E2. A similar division of the current of the stimulus signal into three branches will occur if the electrodes are assigned the polarities shown in rows 422, 426, 432, 434, 440, 444, and 446. Assigning the polarities shown in rows 424, 428, 430, 436, 438, and 442 to the launched electrodes results in the current of the stimulus signal branching to flow through two or more paths. In embodiments, a first electrode and a second electrode with an assigned positive polarity may each form a respective path for the stimulus signal to a third and a fourth electrode with an assigned negative polarity, resulting in four potential paths through which the stimulus signal may flow.

Row 420 of table 400 shows the case in which electrode E3 is assigned a positive polarity and electrodes E0-E2 are all assigned negative polarities. Assuming that electrodes E0-E3 are all electrically coupled to target 310, the current of the stimulus signal provided by the signal generator of handle 110 will divide between the circuits formed by electrodes E3/E0, electrodes E3/E1 and electrodes E3/E2. The current will flow from electrode E3 and depending on the resistance of target 310, a first portion (e.g., of charge, current) will flow into electrode E0, a second portion into electrode E1, and a third portion into electrode E2. A similar division of the current of the stimulus signal into three branches will occur if the electrodes are assigned the polarities shown in rows 422, 426, 432, 434, 440, 444, and 446. Assigning the polarities shown in rows 424, 428, 430, 436, 438, and 442 to the launched electrodes results in the current of the stimulus signal branching to flow through two or more paths. In embodiments, a first electrode and a second electrode with an assigned positive polarity may each form a respective path for the stimulus signal to a third and a fourth electrode with an assigned negative polarity, resulting in four potential paths through which the stimulus signal may flow.

As discussed above, when a stimulus signal travels through target tissue via two or more paths (e.g., circuits) the current density of the stimulus signal in each path is less than if the current traveled through a single path. As the current density through a path decreases, the current through that path is less effective at halting locomotion. At some point, the current density through a path is too low to induce NMI.

Although Table 400 shows the possible polarity assignments for the launched electrodes of FIG. 3, these assignments may not be effective for impeding locomotion of a target because of the decrease in current density in the paths as discussed above.

Table 400 may be expanded to include polarity assignments for any number of launched electrodes. Testing electrodes for connectivity through target tissue may eliminate some rows and/or columns of Table 400 as possible assignments. For example, each of the electrodes E0-E3 may be launched, but testing the electrodes may indicate that electrode E0 is not coupled to the target, causing the combinations of possible polarity assignments associated with the column for electrode E0 and rows 432, 434 from being possible.

Branching of the stimulus signal through multiple paths may be eliminated by providing the stimulus signal through only two electrodes at a time while decoupling (e.g., disconnecting) the other electrodes from the signal generator.

Table 500 of FIG. 5 shows the polarity assignments for the electrodes E0-E3 of FIG. 3 by pairs. The letter "Z" in Table 500 indicates high impedance. High impedance indicates that the corresponding electrode has been decoupled from the signal generator. An electrode that has been decoupled from the signal generator remains electrically coupled to the target, but no current flows through that electrode from the handle of the CEW, and no voltage is applied across that electrode from the handle of the CEW. From the perspective of the target, the electrode exhibits a high impedance. Even though the signal generator provides no current through or voltage across a decoupled electrode, a processing circuit of the CEW may observe (e.g., measure) the voltage on the electrode. Measurement of a voltage on a decoupled electrode was discussed above as a method for using a voltage to detect electrode connectivity to a target.

The plus (e.g., "+") and negative (e.g., "−") signs shown in Table 500 means that the respective electrode has been assigned a positive polarity or a negative polarity. The electrode assigned a positive potential is coupled to the positive voltage (e.g., VHP) of a stimulus signal and the electrode assigned to a negative potential is coupled to the negative voltage (e.g., VHN) of the stimulus signal. The voltage potential between the positive and negative electrodes causes the current of the stimulus signal to flow through target tissue. Because the current flows through a single path through target tissue the likelihood of inducing NMI increases.

For example, in row 520 of Table 500, electrode E0 is assigned a positive polarity (e.g., electrode E0 has a positive potential), electrode E1 is assigned a negative polarity (e.g., electrode E1 has a negative potential), and electrode E2 and electrode E3 are decoupled from the signal generator. When the signal generator applies (e.g., provides) the voltage potential of the stimulus signal across electrode E0 and electrode E1, a current flows through target tissue. The current provides a charge to target tissue that impedes target locomotion. Electrode E2 and electrode E3 do not carry any of the current of the stimulus signal. The signal generator does not apply (e.g., provide) a voltage potential across electrode E2 and electrode E3. In row 526 of Table 500, the current of the stimulus signal again flows through only electrode E0 and electrode E1, and not through electrode E2 and electrode E3; however, the polarity on electrode E0 and electrode E1 have been switched relative to the assignment indicated in row 520. The polarity is switched by applying (e.g., providing) VEIN to electrode E0 and VHP to electrode E1 (e.g., electrode E1 has the positive potential and electrode E2 has the negative potential).

The rows of Table 500 show all of the possible ways to assign polarity to two electrodes selected from electrodes E0-E3 to deliver the stimulus signal through a target. Even though a CEW may be capable of assigning any electrode any polarity, the rows of Table 500 show a method for assigning polarity to two electrodes and decoupling all other electrodes to increase the effectiveness of the stimulus signal when delivered through target tissue.

Table 500 may be expanded to include polarity and decoupling assignments for any number of launched electrodes. Testing electrodes for connectivity through target tissue may eliminate some rows and/or columns of Table 500 as possible assignments.

In various embodiments, a selector circuit may be configured to selectively assign or provide an electrode to a potential (e.g., positive or negative). The selector circuit may couple or decouple an electrode to a potential. The selector circuit couples a voltage with a positive potential (e.g., VHP) to electrodes assigned a positive polarity and a voltage with a negative potential (e.g., VHN) to electrodes assigned a negative polarity. A selector circuit may couple voltage potentials to electrodes in accordance with Table 400 or Table 500. In various embodiments, a selector circuit couples two or more launched electrodes in accordance with Table 500.

Figure 6:
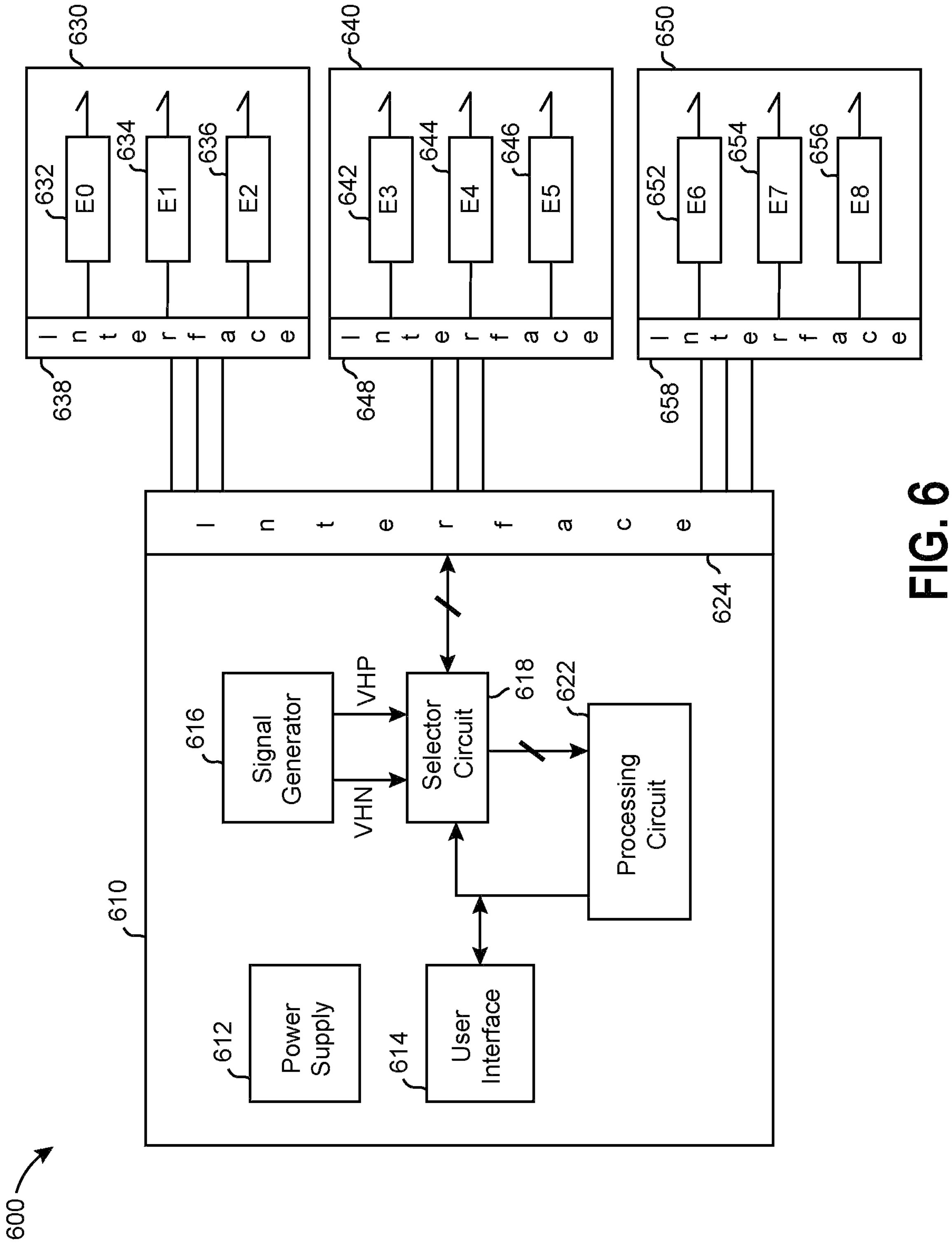
FIG. 6 is a block diagram of an implementation of a CEW, in accordance with various embodiments.

In an implementation of a CEW, referring to FIG. 6, a selector circuit may couple one or more electrodes to one or more voltage potentials as discussed above. CEW 600 includes handle 610, and cartridges 630, 640, and 650. In various embodiments, CEW 600 may include a single cartridge, some of cartridges 630, 640, and 650, or more cartridges than cartridges 630, 640, and 650. A cartridge may have one or more electrodes. A cartridge includes a propellant (not shown) for launching the electrodes toward a target. The electrodes of a cartridge may be launched separately, as groups, or all together.

Handle 610 includes power supply 612, user interface 614, signal generator 616, selector circuit 618, processing circuit 622, and interface 624. Signal generator 616, selector circuit 618, and processing circuit 622 cooperate to provide a stimulus signal to cartridges 630, 640 and 650 via interface 624. Interfaces 638, 648, and 658 couples electrically and/or mechanically to interface 624 of handle 610. Interface 624 conducts (e.g., transmits) the stimulus signal generated by signal generator 616 to cartridges 630, 640, and 650. Cartridges 630, 640 and 650 receive the stimulus signal and other control signals (e.g., launch signal, data signal, etc.) via interface 624 and interfaces 638, 648, and 658 respectively. Interfaces 638, 648, and 658 provide the stimulus signal to the electrodes of cartridges 630, 640 and 650 that are selected by selector circuit 618.

Power supply 612 provides power to generate the stimulus signal, and to power handle 610 and cartridges 630, 640, and 650. Cartridges 630, 640, and 650 each include three electrodes. Cartridges 630, 640, and 650 each removably, mechanically couple to handle 610. Power supply 612 may perform the functions of a power supply, as discussed above.

CEW 600, handle 610, and cartridges 630, 640, and 650 perform the functions of a CEW, handle, and a cartridge as discussed above.

Cartridge 630 includes electrodes 632, 634, and 636, and interface 638. Cartridge 640 includes electrodes 642, 644, and 646. Cartridge 650 includes electrodes 652, 654, and 656. In various embodiments, a cartridge may further include a processing circuit (not shown). Interfaces 638, 648 and 658 interact with interface 624 of handle 610, as described above.

A signal generator provides a signal (e.g., stimulus signal) for interfering with locomotion (e.g., movement) of a human or animal target. A signal generator may provide the stimulus signal as a series of pulses of current. A signal generator may provide a pulse of current by providing a voltage potential that is applied across two or more electrodes, such as the voltage potential between VHP and VEIN as discussed above. The voltage potential causes a current to flow between the two or more electrodes. If the electrodes are electrically coupled to target tissue, the current flows through target tissue thereby causing charge to flow through target tissue. The charge of the current may impede the locomotion of the target.

A signal generator may provide a stimulus signal as a series of current pulses for a period of time. A pulse of current may be provided at one or more magnitudes of voltage during the duration of the pulse. A series of pulses may be delivered at a pulse rate (e.g., 22 pps, 44 pps, etc.) for a period of time (e.g., 5 seconds, etc.). Each pulse of a stimulus signal may have a pulse width.

In various embodiments, the voltage potential of a stimulus pulse provided by a signal generator may be of sufficient magnitude to ionize air in one or more gaps in series with the signal generator and the target. Ionizing air in a gap establishes an ionization path to deliver the stimulus signal through the target.

A signal generator may receive electrical energy from a power supply. A signal generator may convert energy into a stimulus signal for ionizing gaps of air and/or interfering with locomotion of a target.

Signal generator 616 generates stimulus signals by generating high voltages VHP and VHN. VHP is a high voltage with a positive potential. In embodiments, VHP may lie in the range of +500 to +5000 volts. VHN is a high voltage with a negative potential. In embodiments, VHN may lie in the range of −500 to −5000 volts. Signal generator 616 provides voltages VHP and VHN via output conductors (e.g., terminal, wire, metal trace, etc.) of signal generator 616. The output conductors of signal generator 616 couple to selector circuit 618.

In various embodiments, signal generator 616 may additionally provide other signals for testing the electrical coupling of an electrode to a target. Signal generator 616 may provide test signals VTP and VTN. Test signal VTP may have a positive polarity. Test signal VTN may have a negative polarity. Generally, the magnitude of VTP and VTN, when applied as a voltage potential across target tissue, is not sufficient to induce NMI. However, if the current is provided through target tissue then the electrodes electrically couple to target tissue. Signal generator 616 may provide one or more pulses at the voltage potentials VTP and VTN.

A selector circuit selectively couples signal generator 616 to one or more electrodes via interface 624 and interfaces 638, 648, and 658. A selector circuit selectively decouples one or more electrodes from signal generator 616. By selectively coupling or decoupling electrodes, a selector circuit selects two or more electrodes for providing a stimulus signal to a target. A selector circuit may also couple or decouple electrodes to test the electrical connectivity of an electrode to a target.

A selector circuit may cooperate with a processing circuit to determine whether a signal generator should be coupled to one or more electrodes. For example, the processing circuit may control the selector circuit to control coupling of the signal generator to one or more electrodes. A selector circuit may cooperate with a processing circuit to select electrodes for providing a stimulus signal. A selector circuit may include inputs for receiving signals from a signal generator. A selector circuit may include inputs for receiving signals from a processing circuit. A selector circuit may receive input signals (e.g., a voltage) from a signal generator and/or a processing circuit. A selector circuit may provide a signal received from an input of the selector circuit to an output of the selector circuit.

A selector circuit may include any type of circuit suitable for switching high voltage signals and/or pulsed currents. A selector circuit may include high voltage multiplexers (e.g., multiplexors, MUX's, MPX's, etc.), demultiplexers (e.g., demultiplexors, DEMUX's, etc.), relays, semiconductor switches, and switches (e.g., double pole single throw ("DPST"), single pole double throw ("SPDT"), etc.).

In various embodiments, a selector circuit may be integrated into one or more of a processing circuit and/or a signal generator (e.g., a selector circuit, a processing circuit, and a signal generator comprise a single component, a selector circuit and a processing circuit comprise a single component, a selector circuit and a signal generator comprise a single components, etc.). In various embodiments, a selector circuit, a processing circuit, and/or a signal generator may be separate components (e.g., physically distinct and/or logically discrete).

In an implementation, selector circuit 618 electrically couples to signal generator 616, processing circuit 622, and interface 624. Selector circuit 618 receives stimulus signals VHP and VHN at its inputs. Selector circuit 618 selects (e.g., steers, provides, controls, etc.) stimulus signals VHP and VHN for provision on one or more outputs of selector circuit 618. The outputs of selector circuit 618 respectively couple to the electrodes of cartridges 630, 640, and 650 via interfaces 624, 638, 648, and 658. Providing a signal to an output of selector circuit 618 applies the signal to the electrode coupled to that output. Decoupling (e.g., disconnecting) an output of selector circuit 618 decouples the electrode coupled to that output from signal generator 616. Selector circuit 618 may choose to decouple one or more of electrodes 632-636, 642-646, and 652-656 from signal generator 616. As discussed above, a decoupled electrode presents a high impedance (e.g., Z) to target tissue.

Selector circuit 618 couples electrodes to signal generator 616 to provide a stimulus signal or a test signal through a target. A processing circuit, such as processing circuit 622, may determine which electrodes should be assigned a positive polarity, a negative polarity, or be decoupled. Selector circuit 618 implements the polarity and disconnect assignments determined by the processing circuit.

For example, when providing a stimulus signal through a target, selector circuit 618 couples VHP from signal generator 616 to the one or more electrodes that have been assigned a positive polarity. Selector circuit 618 couples VEIN from signal generator 616 to the one or more electrodes that have been assigned a negative polarity. Because selector circuit 618 may provide VHP and VEIN to any electrode, any number of electrodes may be assigned a positive polarity and any number of electrodes may be assigned a negative polarity. Further, selector circuit 618 may decouple any electrode from signal generator 616.

In various embodiments, selector circuit 618 may couple (e.g., connect) and/or decouple (e.g., disconnect) electrodes in accordance with patterns shown in Tables 400 and 500. For example, referring to Table 500, assume that electrodes E0-E3 have been launched and electrically couple to a target. Referring to row 532, selector circuit 618 connects (e.g., applies, provides, etc.) voltage VHN to electrode E0 because processing circuit 622 assigned electrode E0 a negative polarity. Selector circuit 618 connects (e.g., applies, provides, etc.) voltage VHP to electrode E2 because processing circuit 622 assigned electrode E2 a negative polarity. Selector circuit 618 decouples electrode E1 and electrode E3 from signal generator 616 because processing circuit 622 determines that the stimulus signal should be provided by only two electrodes. By coupling and decoupling electrodes as discussed above, selector circuit 618 steers the stimulus signal from signal generator 616 to the selected electrodes with the proper (e.g., assigned) polarity.

In various embodiments, selector circuit 618 may maintain the connections to the selected electrodes for delivery of all pulses of a stimulus signal. In other words, selector circuit 618 may provide all pulses of the stimulus signal via the same electrodes at a respective same polarity for each of the electrodes.

In various embodiments, selector circuit 618 may also respond to changes in electrode selection, electrode polarity, and electrode coupling for one or more pulses of a stimulus signal. In other words, for a first pulse of a stimulus signal, selector circuit 618 may assign voltages (e.g., VHP, VHN) to and decouple electrodes in accordance with row 522 of Table 500. Selector circuit 618 may operate in accordance with row 524 for a next pulse of the stimulus signal. Selector circuit 618 may operate in accordance with any row of Table 400 or Table 500 for any number of pulses of the stimulus signal.

A processing circuit may determine the electrodes for providing a stimulus signal or a test signal for each pulse of a stimulus signal or test signal. Selector circuit 618 operates in accordance with the assignments made by the processing circuit.

In various embodiments, electrode electrical connectivity with a target may be tested while providing a stimulus signals signal. The voltages VHP and VHN are formed by charging a first capacitor to the magnitude of voltage VHP (e.g., +2,500 volts) and a second capacitor to the magnitude of voltage VEIN (e.g., −2,500 volts). When VHP and VEIN are applied to electrodes, if the electrodes electrically couple to a target, the charge stored in the first capacitor and the second capacitor will discharge. The discharge of the first capacitor and the second capacitor demonstrates that the electrodes coupled to the first capacitor and the second capacitor formed a circuit through the target.

However, using voltages that have a lower magnitude for testing saves energy, so the voltages VHIGH and VLOW operate similarly to detect electrical connectivity. Analogous to VHP and VHN, a first capacitor and a second capacitor are charged to VHIGH (e.g., +100 volts) and VLOW (e.g., −100 volts), respectively, and coupled to electrodes. If the capacitors discharge, or discharge more than a threshold, the electrodes are identified as electrically coupling to the target. Further disclosure regarding VHIGH and VLOW, in accordance with various embodiments, is provided below.

As discussed above, selector circuit 618 receives signals from processing circuit 622. Processing circuit 622 may control, in whole or in part, the steering (e.g., application, provision, etc.) of signals from the inputs of selector circuit 618 to the outputs of selector circuit 618. Processing circuit 622 may determine, in whole or in part, whether one or more electrodes electrically couple to a target. Processing circuit 622 may determine, in whole or in part, whether two or more electrodes form a circuit through a target. Processing circuit 622 may keep a record of which electrodes are launched, which electrodes electrically couple to a target, which electrodes have been assigned which polarity, and/or any other information for selecting electrodes for providing a stimulus signal, assigning polarity, and/or providing the stimulus signal through a target.

In various embodiments, a polarity assignment may be assigned by a processing circuit. The processing circuit may perform one or more operations to assign a polarity assignment to one or more electrodes. Assigning the polarity assignment may include determining the polarity assignment and applying the polarity assignment to the one or more electrodes. Determining the polarity assignment may include generating information indicative of an assignment and/or writing information indicative of the assignment in a system memory associated with the processing circuit. For example, information corresponding to one or more tables disclosed herein may be written to a system memory by processing circuit 622. The information may be generated after one or more test results are determined (e.g., received, measured) by the processing circuit 622. Applying the polarity assignment may include reading information corresponding to the polarity assignment from system memory and/or generating one or more signals in accordance with the information to cause an electrode associated with the polarity assignment to be coupled to a conductor of a signal generator on which a stimulus signal of a polarity corresponding to the polarity assignment is provided. In embodiments, applying the information may include reading the information from system memory and generating the one or more signals in accordance with the information.

In various embodiments, assigning a polarity assignment may include generating one or more select and/or enable signals by a processing circuit. For example, processing circuit 622 may determine a polarity assignment associated with a high polarity for electrode E0 and generate select and enable signals to couple electrode E0 to a conductor with signal VHN from signal generator 616. The signals may include an enable signal and/or a select signal for MUX's 718, 720, 730 or 732, and 740, with reference to FIG. 7. The assigning of the polarity assignment may include generating one or more select or enable signals to couple an electrode to a first conductor with first signal from a signal generator among a plurality of conductors from the signal generator, wherein the first electrode is configured to be coupled individually to each of the conductors upon generator of a respective set of signals from a processing circuit. Assigning the polarity may include altering one or more select or enable signals generated by a signal processor to couple or decouple an electrode to a signal generator conductor in accordance with the polarity assignment.

In various embodiments, a polarity assignment may be assigned in accordance with a test result. A polarity assignment of the one or more electrodes may not be assigned until after the test result is determined. The polarity assignment may be determined after the test result is determined by a processing circuit. The processing circuit may determine (e.g., apply, generate) the polarity assignment in accordance with the determined test result, thereby matching the polarity assignment to a corresponding number and selection of launched electrodes that are also determined to be coupled to a target.

In various embodiments, a processing circuit may assign a polarity of an electrode in accordance with a predetermined set of polarity assignments. For example, processing circuit 622 may be configured to assign one or more polarities in accordance with a number of launched electrodes. A first electrode may have a first assigned polarity in a first polarity assignment for a first number of launched electrodes and a second assigned polarity in a second polarity assignment for a second number of launched electrodes, the second number larger than the first number and the polarity assignment changed from the first polarity assignment to the second polarity assignment upon launch of the second number of launched electrodes. Another electrode, different from the first electrode, may change from an assigned second polarity to an assigned first polarity or remain assigned to the second assigned polarity upon launch of the second number of launched electrodes. The other electrode may change or not change an assigned polarity in accordance with the first and second polarity assignments. In embodiments according to various aspects of the present disclosure, the polarity assignment may be determined independent of a test result, including without one or more test results being determined.

In various embodiments, one or more polarity assignments may be changed over time. For example, processing circuit 622 may be configured to assign different polarities to a same electrode. A first electrode may have a first polarity assignment at a first time and a second polarity assignment at a second time, the second time after the first time. The electrode may receive a stimulus signal with a same or a different magnitude between the first time and the second time, but with different polarities.

In various embodiments, a change in polarity assignment may be performed automatically. Processing circuit 622 may receive or detect one or more inputs and change one or more output signals in accordance with the received or detected input. For example, a polarity assignment for each electrode of a plurality of electrodes may be changed in accordance with one or more of a change in time and one or more test results. In embodiments, one or more first electrodes of a set of electrodes may be changed automatically, while one or more second electrodes of the set of electrodes may retain a same polarity assignment upon change of the polarity assignment of the one or more first electrodes. Automatically changing a polarity assignment may include automatically assigning a polarity assignment. In embodiments, automatically changing a polarity may include changing or assigning a polarity assignment independent of a manual input received by a respective CEW.

In various embodiments, a change in polarity assignment may be performed based on a previous polarity assignment. For example, it may be desired to change polarity assignment between each pulse of a stimulus signal. Changing polarity assignment between each pulse of the stimulus signal may provide health benefits to the human or animal target, while still inducing NMI. In various embodiments, changing polarity assignment based on a previous polarity assignment may include providing a positive potential to an electrode during a first polarity assignment, and a negative potential to the electrode during a second polarity assignment. The first polarity assignment may be performed prior to a first pulse of a stimulus signal. The second polarity assignment may be performed after the first pulse of the stimulus signal, such as before a second pulse of the stimulus, after a repeated pulse of the stimulus signal, or the like.

For example, a signal generator may provide a first pulse of a stimulus signal through a target via a first electrode and a second electrode coupled to the target. The first electrode may provide a positive potential of the first pulse and the second electrode may provide a negative potential of the first pulse. The signal generator may provide a second pulse of the stimulus signal through the target via the first electrode and a third electrode. The first electrode may provide the negative potential of the second pulse and the third electrode may provide the positive potential of the second pulse. In that regard, the first electrode may provide the stimulus signal during both the first pulse and the second pulse, but may provide different voltage potentials during each of the pulses.

In various embodiments, power supply 612 provides power for the operation of user interface 614, signal generator 616, selector circuit 618, processing circuit 622, and/or interface 624. Power supply 612 provides the energy to form a stimulus signal. Power supply 612 may provide power to cartridges 630, 640, and/or 650, so the cartridges may perform one or more functions.

User interface 614 may perform the functions of a trigger and/or a control interface, as discussed further herein. For example, processing circuit 622 may communicate with user interface 614 to display information to the user. In embodiments, 614 may perform the functions of user interface 114 with brief reference to FIG. 2. User interface 614 may comprise one or more alert devices configured to provide an alert to a user of CEW. The one or more alert devices may comprise one or more of a haptic device, an audio device, and/or a light device. The haptic device may perform the functions of haptic device 118, the light device may perform the functions of light device 117, and/or the audio device may perform the functions of audio device 116 with brief reference to FIG. 2. The alert device may be disposed on an interior or exterior surface of the CEW. The alert device may receive information from processing circuit 622 to trigger an alert. Alerts may comprise of one or more of a haptic alert (e.g., a vibration of a portion of or all of the CEW), an audible alert (e.g., a beep or a set of notes, words, or the like), and/or a visible alert (e.g., a LED or other light device turning on, off, or flashing; an electronic display displaying one or more words or phrases corresponding to the alert, or the like). In other examples, user interface 614 may comprise different alert devices, and the alert devices may generate alerts in different ways than those described herein.

As a further example, processing circuit 622 cooperates with user interface 614 to launch electrodes from cartridges 630, 640, and 650 at a target. Processing circuit 622 may use information received from selector circuit 618 to determine the electrical connectivity of electrodes with a target. Processing circuit 622 may use information regarding electrode connectivity to control selector circuit 618. Processing circuit 622 may control selector circuit 618 to assign a positive polarity to one or more electrodes, assign a negative polarity to one or more electrodes, and/or decouple one or more electrodes from signal generator 616. Processing circuit 622 may control selector circuit 618 steer test voltages to one or electrodes. Processing circuit 622 performs the functions of a processing circuit disclosed herein.

A cartridge may removably couple to a handle. For example, a cartridge may be inserted within a bay of the handle. A cartridge may include one or more electrodes. The cartridge may receive a stimulus signal from a signal generator. The cartridge may provide the stimulus signal to one or more electrodes. The cartridge may contain a propellant (e.g., pyrotechnic, compressed gas etc.). A processing circuit of a CEW may provide one or more launch signals to a cartridge to activate the propellant to launch of one or more electrodes from a cartridge. A processing circuit may provide the one or more launch signals responsive to operation of a control (e.g., trigger) by a user of the CEW. Upon activation, the propellant propels the one or more electrodes toward a target. As the one or more electrodes fly toward the target, a respective filament deploys between the one or more electrodes and the cartridge to electrically couple the electrodes to the CEW. A filament may be stored in the body of the electrode. Movement of an electrode toward the target deploys the filament to bridge (e.g., span) the distance between the target and the CEW.

Cartridges 630, 640, and 650 perform the functions of a cartridge as disclosed herein.

Figure 7:
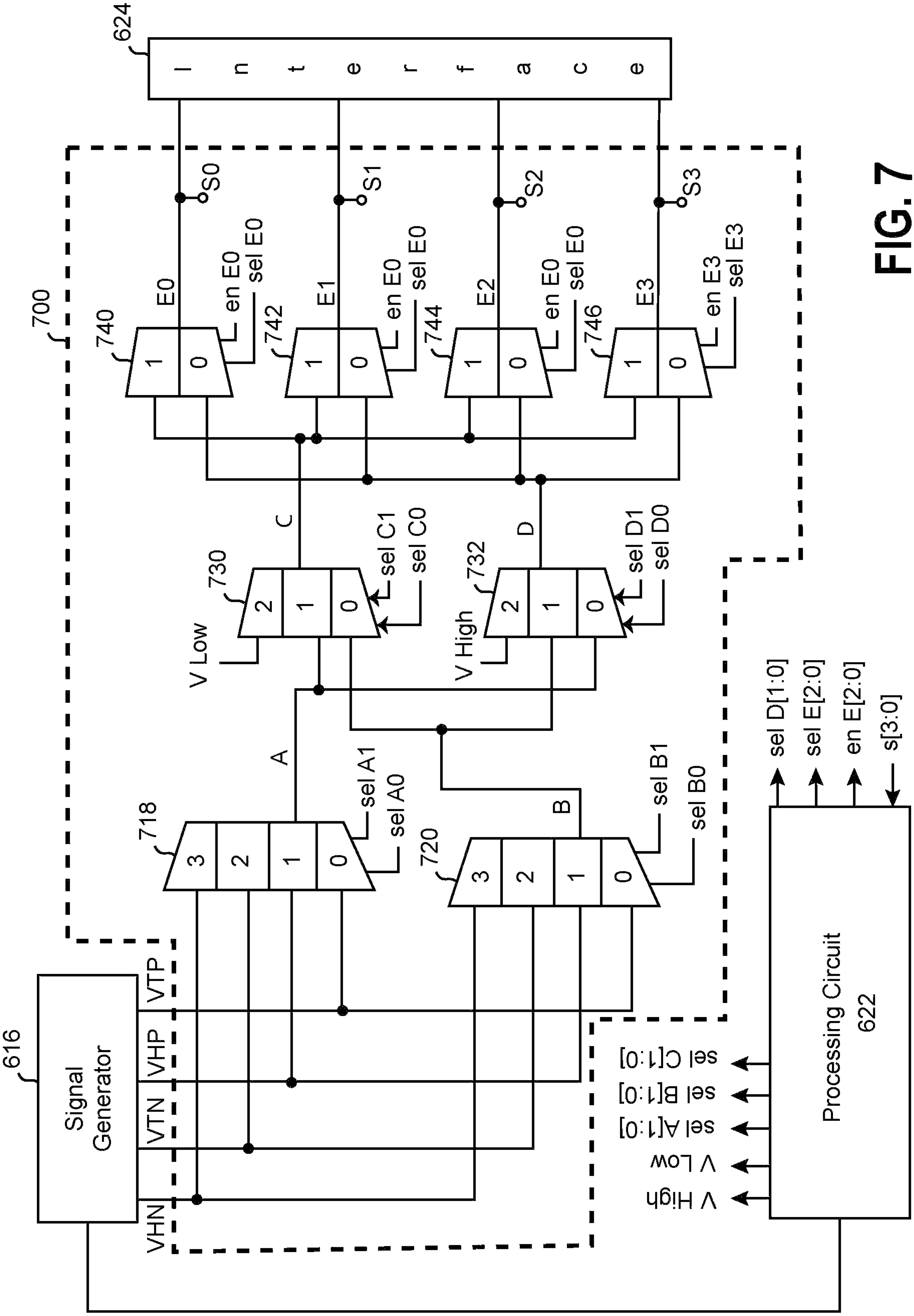
FIG. 7 is an implementation of a selector circuit, in accordance with various embodiments.

Selector circuit 700, shown in FIG. 7, is an implementation of selector circuit 618, in accordance with various embodiments. Selector circuit 700 is implemented using one or more multiplexers (e.g., multiplexors, MUX's, MPX's, etc.). A multiplexer (e.g., multiplexor, MUX, MPX, etc.) may be implemented using any suitable technology. A multiplexer selects one or more inputs so that a signal on each selected input is presented on (e.g., steered to, provided to, etc.) one or more outputs. In various embodiments, a multiplexer may comprise a combinational logic circuit designed to switch one of a plurality of input lines to a single common output line by the application of a control signal. In various embodiments, a multiplexer may be digital or analog. A digital multiplexer may include digital circuits (such as high speed logic gates) used to switch digital or binary data. An analog multiplexer may include transistors, gates, relays, etc. configured to switch one of the voltage or current inputs through to a single output.

Figure 8:
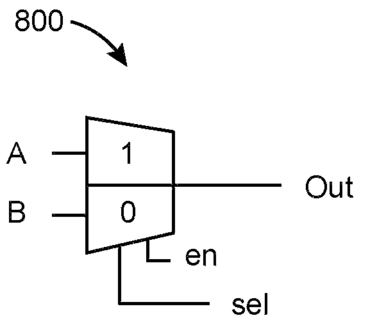
FIGS. 8-10 are truth tables for the multiplexers of FIG. 7, in accordance with various embodiments.
Figure 9:
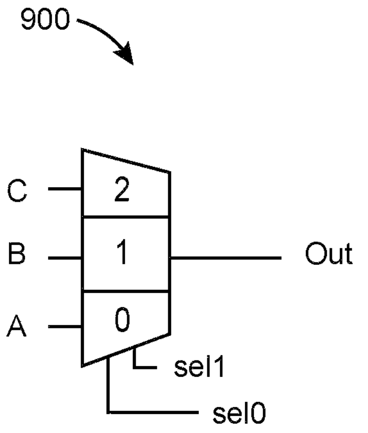
Figure 10:
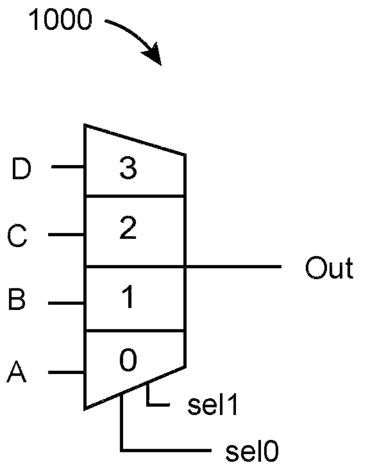

The symbols and truth tables for the MUX's used to implement selector circuit 700 are shown in FIGS. 8-10, in accordance with various embodiments.

In various embodiments, one or more of MUX 740, 742, 744, and 746 may include a 2-1 MUX, such as a MUX 800, with reference to FIG. 8. A 2-1 MUX may consist of two inputs, a select input and/or an enable input, and one output. The output is connected to either of the inputs based on the select input and/or the enable input. As shown in FIG. 8, MUX 800 may receive two inputs, two select signals (e.g., an input signal and an enable signal), and provide a single output. MUX 800 is selectively enabled or not enabled to provide or not provide any output in accordance with a first select signal of the two select signals (e.g., the enable signal). MUX 800 may provide an output corresponding to one of the inputs in accordance with a second select signal of the two select signals (e.g., the input signal) when an output is enabled to be provided.

In various embodiments, one or more of MUX 730 and 732 may include a 3-1 MUX, such as a MUX 900, with reference to FIG. 9. A 3-1 MUX may consist of three inputs, two select inputs, and one output. The output is connected to one of the three inputs based on the select inputs. As shown in FIG. 9, MUX 900 may receive three inputs and provide an output corresponding to one of the inputs in accordance with a first select signal and a second select signal received by the MUX 900.

In various embodiments, one or more of MUX 718 and 720 may include a 4-1 MUX, such as a MUX 1000, with reference to FIG. 10. A 4-1 MUX may consist of four inputs, two select inputs, and one output. The output is connected to one of the four inputs based on the select inputs. As shown in FIG. 10, MUX 1000 may receive four inputs and provide an output corresponding to one of the inputs in accordance with a first select signal and a second select signal received by the MUX 1000.

Selector circuit 700 may use a combination of one or more MUX's to select between one or more input signals and output the selected signals to one or more electrodes. A MUX may be controlled by inputs, herein referred to as a select input, which select one or more inputs for steering to one or more outputs. A MUX may further be controlled by an enable signal that determines whether an output of the MUX is driven or decoupled so that it presents a high impedance.

In FIG. 7, selector circuit 700 is shown cooperating with signal generator 616, processing circuit 622, and interface 624 to provide signals to electrodes. Signal generator 616, processing circuit 622, and interface 624 perform the functions of a signal generator, a processing circuit, and an interface as discussed above.

Selector circuit 700 includes two 4-1 MUX's, two 3-1 MUX's, and four 2-1 MUX's, which cooperate to perform the functions of the selector circuit. The inputs of MUX's 718 and 720 are the inputs of selector circuit 700. The outputs of selector circuit 700 are the outputs of MUX's 740-746. The outputs of MUX's 740-746 provides signals to interface 624, which provides the signals to electrodes E0-E3. Other inputs to selector circuit 700 include the select inputs and enable inputs to the MUX's. In this implementation, the select input and the enable input are driven by processing circuit 622.

Signal generator 616 provides signals VHP/VHN and signals VTP/VTN as inputs of selector circuit 700. As discussed above, stimulus signals VHP/VHN are provided to a target to interfere with the locomotion of the target. Testing signals VTP/VTN test whether one or more launched electrodes has electrical connectivity with a target. Processing circuit 622 provides signals to one or more MUX's. Signals provided by processing circuit 622 drive MUX inputs (VHIGH, VLOW), select inputs, and enable inputs of one or more MUX's. Processing circuit 622 controls the select inputs and the enable inputs of the MUX's of selector circuit 700 to determine which input is steered to which output. Processing circuit 622 controls the select inputs and the enable inputs in accordance with assigning polarity and decoupling the electrodes. The polarities assigned by processing circuit 622 to the electrodes may be referred to as a polarity assignment. Decoupling one or more electrodes from signal generator 616 may be referred to as a decoupling assignment. Processing circuit 622 may change the polarity assignment and/or decoupling assignment from time to time, as discussed further herein.

In various embodiments, and with reference to FIG. 11, Table 1100 shows the relationship of the input signals, the select signals, and the enable signals to the output signals of selector circuit 700. Table 1100 shows how select signals and enable signals may steer a particular input signal to a specific electrode. In particular, Table 1100 shows how processing circuit 622 controls select inputs and enable inputs to steer stimulus signals VHP/VHN to the outputs of selector circuit 700 for delivery to a target via electrodes.

In various embodiments, and with reference to FIG. 18, Table 1800 shows how selector circuit 700 steers voltages VLOW/VHIGH and VTP/VTN to the electrodes to test connectivity.

Table 1100 includes columns 1102-1116 and rows 1130-1140. Table 1100 does not include all combinations of all input or output signals. Each column refers to a group of signals on select inputs, enable inputs, or outputs. For example, column 1102 shows the signals that drive the four select inputs for MUX's 718 and 720, column 1104 shows the output signals at outputs A and B of MUX's 718 and 720 respectively, column 1106 shows the signals that drive the four select inputs for MUX's 730 and 732, column 1108 shows the signals at outputs C and D of MUX's 730 and 732 respectively, and so forth. Outputs E0-E3 drive or are decoupled from electrodes E0-E3 respectively.

The symbol "X" as used in any table herein refers to the value of the input being irrelevant to the outcome. The symbol "Z" as used in any table herein refers to high impedance, as previously discussed herein. In selector circuit 700, the outputs that drive the electrodes may be decoupled from signal generator 616 by disabling MUX's 740, 742, 744, and/or 746. The numbers "1" and "0" as used in any table herein refer to a logic high value and a logic low value respectively. The magnitude of voltage needed for a logic high value and a logic low value depends on the technology used to implement selector circuit 700, in accordance with various embodiments.

The rows of Table 1100 show some of the values of the signals at inputs and outputs of selector circuit 700. Row 1130 shows the inputs that result in electrode E0 being assigned VHN, electrode E1 being assigned VHP, and electrodes E2-E3 being decoupled. Row 1130 shows how selector circuit 700 operates to implement the polarity assignment of row 526 of Table 500. In particular, electrode E0 is assigned a negative polarity, electrode E1 is assigned a positive polarity, and electrodes E2 and E3 are decoupled.

Column 1116 identifies the polarity assignment of either Table 400 or Table 500, with brief references to FIGS. 4 and 5, that corresponds to the polarities assigned by selector circuit 700 for the given input values. In particular, as discussed above, the input values shown in row 1130 when applied to selector circuit 700 provide output values to electrodes E0-E3 that correspond to row 530 in Table 500. The input values shown in row 1132 correspond to row 434 in Table 400. In particular, electrodes E0 is assigned a positive polarity and electrodes E1, E2 and E3 are assigned a negative polarity.

As described above, the polarity assignments described in row 434 and implemented in row 1132 result in the current of the stimulus signal being divided (e.g., branching) through the various circuits formed between electrodes. One electrode (e.g., E0) applies a positive polarity (e.g., VHP) to the target, while other electrodes (e.g., E1, E2, E3) apply a negative polarity (e.g., VHN). The current provided via E1 divides through electrodes E1, E2 and E3, thereby decreasing the current density through any one circuit (e.g., E0-E1, E0-E2, E0-E3). The polarity assignment implemented in row 1132 may not be effective for impeding locomotion of the target because the current density through any one circuit may be too low to induce NMI.

However, rows 1130, 1134, 1138, and 1140 of Table 1100 describe input values to selector circuit 700 that conduct the stimulus signal through only two electrodes while disconnecting the other electrodes. So, the input signals for rows 1130, 1134, 1138, and 1140 are suitable for delivering a stimulus signal to a target which may likely induce NMI because the current of the stimulus signal flows through the target by way of only one circuit.

Figure 12:
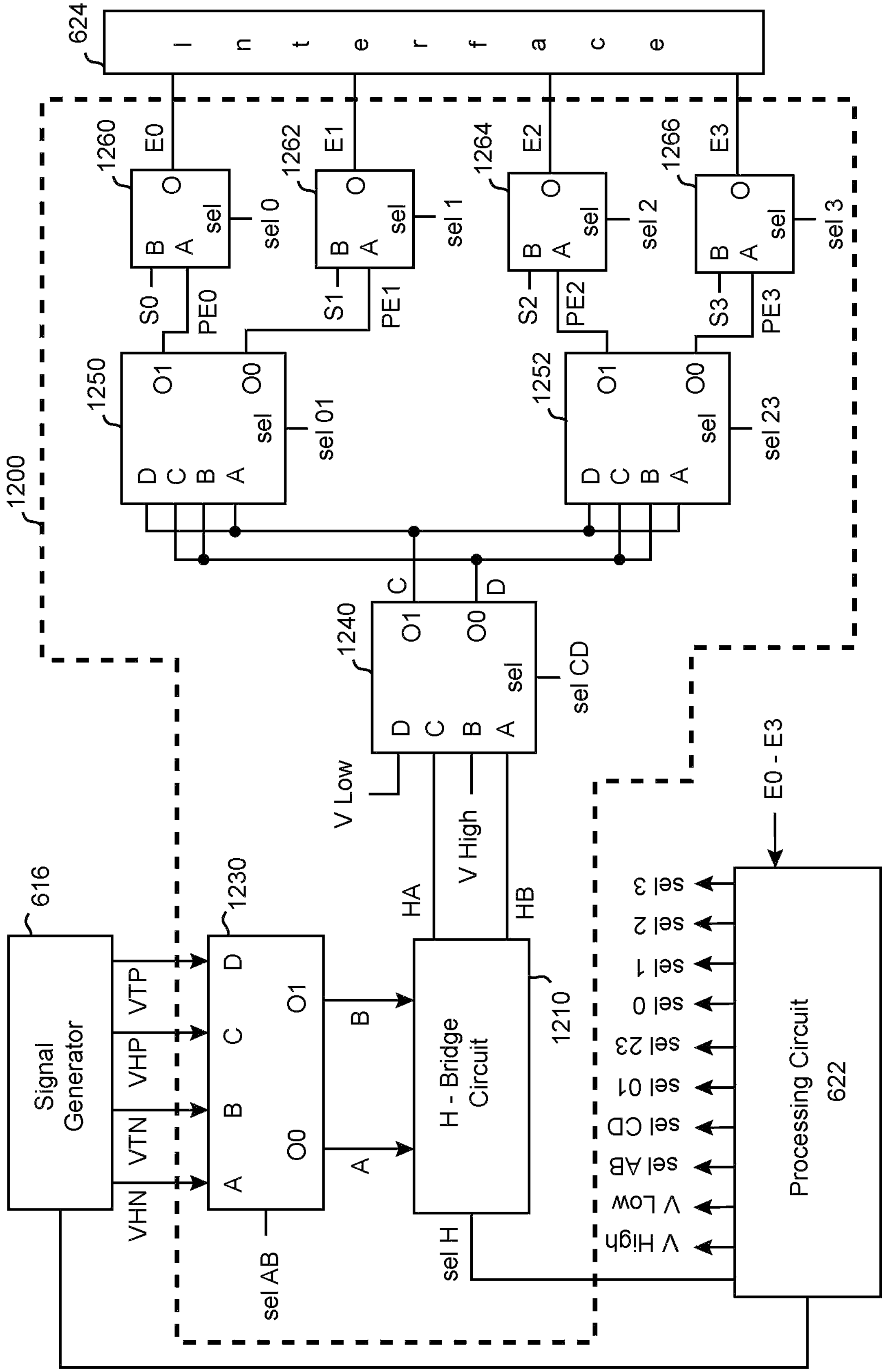
FIG. 12 is an implementation of a selector circuit, in accordance with various embodiments.

Selector circuit 1200, shown in FIG. 12 and in accordance with various embodiments, is another implementation of selector circuit 618. Selector circuit 1200 is implemented using relays and an H-bridge circuit. A relay may be implemented using any suitable technology. A relay selects one or more inputs so that the signal on the selected inputs is presented on (e.g., steered to) one or more outputs. A relay may also be described as being similar to a switch. For example, a relay may be described as performing, for example, the functions of a single pole double throw ("SPDT") switch or, as another example, the functions of a double pole double throw ("DPDT") switch. Relays are particularly suitable for switching high voltages (e.g., 1000-10000 volts) such as the voltages of a stimulus signal.

Figure 13:
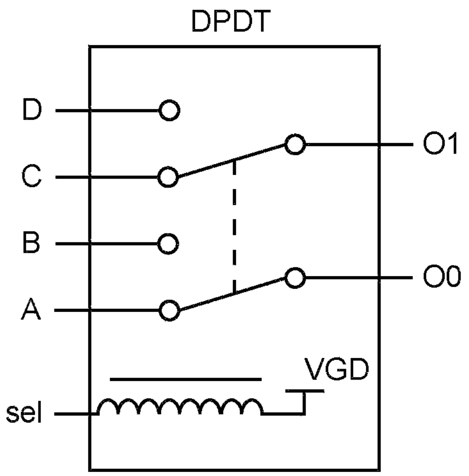
FIGS. 13-14 are truth tables for the relays of FIG. 12, in accordance with various embodiments.
Figure 14:
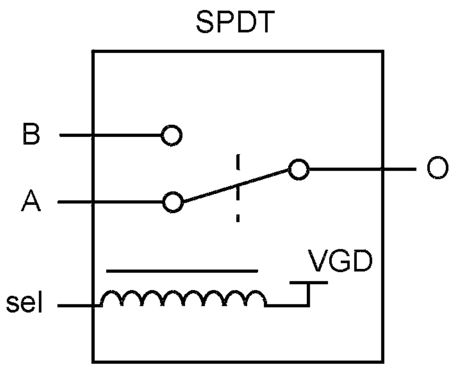

The symbol and truth table for the relays used to implement selector circuit 1200 are shown in FIGS. 13-14. An H-bridge may be implemented using any suitable technology. An H-Bridge may be used to switch (e.g., flip) the signals at the output of the H-bridge. If the signals have different polarity, then an H-bridge may be used to switch the polarity of a voltage applied to a load. For example, H-bridge circuit 1210 includes inputs A and B, outputs HA and HB, and select SelH. When SelH is a logical 0, H-bridge circuit 1210 passes input A to output HA and input B to output HB. When SelH is a logical 1, H-bridge circuit 1210 passes input A to output HB and input B to HA.

Selector circuit 1200 may use a combination of one or more relays and H-bridges to select between one or more input signals and provide the selected signals to one or more electrodes. Selector circuit 1200 cooperates with signal generator 616, processing circuit 622, and interface 624 to provide signals to electrodes or to disconnect electrodes. Selector circuit 1200 includes four DPST relays, one H-Bridge, and four SPDT relays which cooperate to perform the functions of selector circuit 618 as described above. The outputs of relays 1260-1266 provides signals to interface 624, which provide the signals to electrodes.

The principles disclosed with respect to selector circuit 1200 may be extended to include any number of electrodes.

Signal generator 616 provides signals VHP/VHN and VTP/VTN as inputs to selector circuit 1200. As discussed above, stimulus signals VHP/VHN are provided to a target to interfere with the locomotion of the target. Testing signals VTP/VTN may be used to test whether one or more launched electrodes has electrical connectivity with the target and/or whether two or more electrodes may establish a circuit through a target.

Signals provided by processing circuit 622 may be applied to select inputs of one or more relays. Processing circuit 622 controls the select inputs of the relays to determine which inputs to selector circuit 1200 are steered to which output. Processing circuit 622 may further provide input signals such as VLOW and VHIGH to relay 1240. As discussed above, signals VLOW/VHIGH are used to test the connectivity of launched electrodes to a target using a voltage, as opposed to the current used by VTN and VTP, to test for electrical connectivity.

Processing circuit 622 provides signals to one or more relays. Processing circuit 622, as discussed above, provides signals as logical 0s or 1s. A signal from processing circuit 622 may be level shifted to drive the input (e.g., input, select) of a relay.

In various embodiments, and with reference to FIG. 15, Table 1500 shows the relationship between input signals and select signals of selector circuit 1200 and the value of the resulting output signals. Table 1500 shows how select signals may be driven to steer (e.g., provide) a particular input signal to a specific electrode. In particular, Table 1500 shows how processing circuit 622 controls select inputs to steer stimulus signals VHP/VHN to the outputs of selector circuit 1200 for delivery to a target via electrodes.

Table 1500 does not show how test signals VTN and VTP or test signals VLOW and VHIGH are steered to the electrodes. Table 1600 and Table 1700, with brief reference to FIGS. 16 and 17, show how select selector circuit 1200 steers voltages VTP/VTN and VLOW/VHIGH to electrodes to test connectivity. The test signals are discussed in more detail below.

Table 1500 includes columns 1502-1516 and rows 1530-1540. Table 1500 does not include all combinations of input signals or output signals. Each column refers to a group of select inputs, enable inputs, and output signals. Column 1502 shows the signal that drives select input selAB and output signals at outputs O0 and O1, column 1504 shows the signal that drives the selH input and output signals at outputs HA and HB, column 1508 shows the signals that drives select inputs Sel01 and Sel23, and so forth. Outputs E0-E3 drive or are decoupled from electrodes E0-E3 respectively.

Nodes E0-E3 may include a high impedance (e.g., >1 megaohms, >10 megaohms, >100 megaohms) pull-down (not shown) so that electrodes that are not connected to a target are pulled to zero volts.

Input B on relays 1260-1266 is not connected to anything, so when the select signal (e.g., sel0, sel1, sel2, sel3) for one of relays 1260-1266 go to a logic 1, the output is not connected to input B and is thereby not connected to anything. When the sel0, sel1, sel2, or sel3 is driven by a logic 1 value, the output of that relay is in essence decoupled and presents a high impedance ("Z").

Table 1500 shows how stimulus signals VHP/VHN is steered from signal generator 616 to the electrodes and how electrodes may be decoupled from signal generator 616. Not all possible combinations of input and output values are shown in Table 1500. A few of the rows of Table 1500 are discussed to provide an understanding of the operation of selector circuit 1200. Row 1530 shows the inputs that result in electrode E0 being assigned VHN, electrode E1 being assigned VHP, and electrodes E2, E3 being decoupled. Row 1530 corresponds to assigning a negative polarity to electrode E0 and a positive polarity to electrode E1. Row 1530 shows how selector circuit 1200 operates to provide the polarity assignment of row 526 of Table 500.

Column 1516 of Table 1500 identifies the row in Table 500 that corresponds to the polarity assignment provided by selector circuit 1200 for the given input values. Selector circuit 1200 cannot provide the polarity assignments shown in Table 400. Selector circuit 1200 provides the stimulus signal via two electrodes at any one time and not through three or more electrodes.

The input values shown in row 1532 of Table 1500 assign a positive polarity to electrode E3, a negative polarity to electrode E0, and decouple electrodes E1 and E2. Row 1532 shows how selector circuit 1200 operates to provide the polarity assignment of row 538 of Table 500.

As discussed above, signals may be delivered to a target to test (e.g., determine) whether the electrodes electrically couple to the target and/or whether a pair of electrodes form a circuit through the target. After two or more electrodes have been launched toward a target, the electrodes may or may not form a circuit through a target. Electrodes that miss the target cannot form a circuit through the target. Electrodes that strike insulated material (e.g., non-conductive coat, rubberized raincoat, etc.) on the target cannot establish a circuit through the target.

After electrodes have been launched and have the opportunity to reach a target, selector circuits 700 and 1200 may steer test signals to the launched electrodes to test the electrical connectivity of the electrodes with the target and the ability of a pair of electrodes to provide a stimulus signal through target tissue.

Electrodes may be tested using one or more methods. For example, as described above, testing using a current may be performed by assigning the signals VTN and VTP to a pair of electrodes. If the signals VTN and VTP deliver a current through the target, that pair of electrodes are connected to and form a circuit through the target. All pairs of launched electrodes may be tested to determine which electrodes are electrically coupled to the target and which electrode pairs form a circuit through the target.

In various embodiments, and with reference to FIG. 16, Table 1600 shows how processing circuit 622 controls select inputs of selector circuit 1200 to steer test signals VTP/VTN to the electrodes to test connectivity. In particular, processing circuit 622 drives select input SelAB with a logical 1 so MUX 1230 steers test signals VTP/VTN from signal generator 616 to the outputs of MUX 1230. Processing circuit 622, drives the other inputs of selector circuit 1200 to steer signals VTP/VTN to the output of selector circuit 1200 and to the launched electrodes.

In various embodiments, selector circuit 1200 tests only two electrodes at a time using signals VTP/VTN. All other electrodes are disabled and present a high impedance to the target. As discussed above, signals VTP/VTN are formed by signal generator 1216 by charging one capacitor to a negative voltage (e.g., VTN) and another capacitor to a positive voltage (e.g., VTP). Selector circuit 1200 electrically couples the negatively charged capacitor to a first electrode and the positively charged capacitor to a second electrode. If both of the first electrode and the second electrode are electrically coupled to the target, the capacitors will discharge at least partially. The capacitors may be observed (e.g., tested, monitored). If charge discharges from the capacitors through the selected electrodes, the pair of electrodes is considered to be coupled (e.g., connected) to and to form a circuit through the target. If no charge, or an amount less than a threshold, discharges from the capacitors through the selected electrodes, the pair of electrodes is not considered to be coupled to or through the target.

Processing circuit 622 may test and/or monitor the capacitors. Processing circuit 622 may keep a record (e.g., stored in memory) of those electrodes and/or electrode pairs that are electrically coupled to or for a circuit through the target. For example, processing circuit 622 may record that electrodes E1 and E3 electrically couple to the target and electrodes E2 and E0 do not electrically couple to the target. Processing circuit 622 may further record that the electrode E1 and E3 form a circuit through the target. Any two electrodes that electrically couple to a target form a circuit through the target.

The magnitude of voltages VTP may be in the range or 10 volts to 1000 volts. The magnitude of voltages VTP may be in the range or −10 volts to −1000 volts. As discussed above, stimulus signal VHP/VHN may be used to test the electrical connectivity of electrodes similarly to voltages VTP/VTN.

Table 1600 includes columns 1502-1516 as discussed above with respect to Table 1500 above. Rows 1630-1640 shows example input signal values and the resulting output signal values. Not all possible combinations of input and output values are shown in Table 1600.

Electrode electrical connectivity with a target may also be tested by providing test signals VHIGH and VLOW to one of a pair of launched electrodes while observing the voltage induced on the other launched electrodes.

In various embodiments, Table 1700 of FIG. 17 shows how selector circuit 1200 steers test signals VHIGH and VLOW to the outputs of selector circuit 1200 to test electrode connectivity. Processing circuit 622 may provide (e.g., drive) the signals VLOW and VHIGH. Signals from processing circuit 622 may be level shifted to provide signals VLOW and VHIGH. Signals VLOW and VHIGH may be provided by a circuit that is separate from processing circuit 622.

Table 1700 includes columns 1502-1516 as discussed above with respect to Table 1500. Rows 1730-1740 shows input signal values and the respective output signal values. The rows of Table 1700 show the values at each input to selector circuit 1200 and the value of the resulting output for testing electrode connectivity using VLOW and VHIGH. Not all possible combinations of inputs are shown in Table 1700. Row 1730 shows the inputs that result in electrode E0 being assigned VHIGH, electrode E1 being assigned VLOW, and electrodes E2, E3 being decoupled so that selector circuit 1200 does not drive electrodes E2 and E3 with a signal.

Processing circuit 622 drives select input SelCD to a logical 1 in order to steer test signals VHIGH and VLOW to outputs D and C respectively and from there to two electrodes. All electrode pair combinations may be tested. Row 1730 shows how selector circuit 1200 operates to provide the polarity assignment of row 526 of Table 500.

After selector circuit 1200 has provided VLOW and VHIGH to two electrodes, processing circuit 622 may measure the voltage on the other, decoupled electrodes to determine electrical connectivity. Assume, referring to row 1730, that VHIGH is applied to electrode E0 and VLOW is applied to electrode E1. Assume also that electrode E2 is electrically coupled to the target, but that electrode E3 is not electrically coupled to the target. Note that sel2 and sel3 are driven by processing circuit 622 to a logical 1, which connects electrode E2 to open (e.g., floating) input s2 and electrode E3 to open input s3, thereby decoupling electrode E2 and E3 from signal generator 616 so as to present a high impedance to the target.

Because electrodes E0-E2 electrically couple to target tissue, providing VLOW and VHIGH across electrodes E0 and E1 may induce a voltage on electrode E2. The tissue of a body is similar to a resistive load. The voltage difference between VHIGH and VLOW is dropped across the target tissue between the electrodes E0 and E1. If electrode E2 is positioned in target tissue between or near electrodes E0 and E2, the voltage of target tissue at electrode E2 will lie somewhere between VHIGH and VLOW. The value of the voltage induced on electrode E2 may be read by processing circuit 622 at S2. Assume that VLOW is 10 volts and VHIGH is 100 volts. If processing circuit detects a voltage in that range of VLOW to VHIGH on electrode E2, say for example 35 volts, then processing circuit 622 knows that electrode E2 electrically couples to target tissue.

Processing circuit 622 will not detect a voltage at S3 because electrode E3 is not electrically coupled to target tissue. Processing circuit 622 will read 0 volts on electrode E3. Because the voltage on electrode E3 is not in the range of VLOW to VHIGH, processing circuit 622 knows that electrode E3 does not electrically couples to target tissue.

Using a voltage to test connectivity may be used to test three or more launched electrodes. Two electrodes are used to apply the test voltage VLOW and VHIGH to target tissue and the remaining electrodes are tested to detect a voltage in the range of VLOW to VHIGH.

The test voltage VHIGH may be as high as 500 volts. The test voltage VLOW is generally non-zero, so that electrodes that do not electrically couple to the target may be detected by detecting a zero voltage on them. The electrodes that do not provide VHIGH and VLOW are coupled to a high impedance pull-down so that electrodes that do not electrically coupled to the target are pulled to zero volts. In another implementation VLOW=1 volt and VHIGH=10 volts.

In another implementation, the test voltage VHIGH is 12 volts and VLOW is one volt. Using a lower voltage (e.g., 1-20 volts) enables the test signal to be applied for a longer period of time (e.g., >100 ms) thereby providing more time for measuring the voltage induced in the other probes.

Processing circuit 622 may store the results of testing. For example, processing circuit 622 may store the results of testing in a memory. Processing circuit 622 may use test results, whether current or voltage tests results, to identify pairs of electrodes for providing the stimulus signal through the target. Processing circuit 622 may use the results of testing to drive the inputs of a selector circuit to provide a stimulus signal to a target. Processing circuit 622 may use the results of testing to select electrodes (e.g., an electrode pair) for providing a stimulus signal to a target.

Testing the connectivity of electrodes using a voltage may also be performed using the implementation of selector circuit 700. In various embodiments, Table 1800 of FIG. 18 shows how processing circuit 622 may control selector circuit 700 to steer test signals VHIGH/VLOW to test electrode connectivity. In particular, processing circuit 622 drives select inputs SelC1 and SelD1 to a logical 1 to steer signals VHIGH/VLOW to the outputs of selector circuit 700. As disclosed above, processing circuit 622 may provide the signals VLOW and VHIGH. Signals from processing circuit 622 may be level shifted to provide signals VLOW and VHIGH. Signals VLOW and VHIGH may be provided by a circuit that is separate from processing circuit 622.

Table 1800 includes columns 1102-1116 as discussed above with respect to Table 1100. Rows 1830-1826 show input signal values and the resulting output signal values. Not all combinations of inputs are shown in Table 1800. Rows 1830-1832 show how the voltages VHIGH and VLOW may be applied to electrodes to test electrode connectivity with voltage. Rows 1834-1836 show how test voltages VTP and VTN may be applied to electrodes to test electrode connectivity with a current.

Row 1830 shows the inputs values that result in electrode E0 being assigned VHIGH, electrode E3 being assigned VLOW, and nodes E1-E2 being decoupled.

Assume that all electrodes E0-E3 electrically couple to target tissue. As discussed above with respect to Table 1700, applying VHIGH to electrode E0 and VLOW to electrode E3 may induce a voltage on electrodes E1-E2. Processing circuit 622 may detect a voltage on electrodes E1-E2 by detecting the voltage at nodes s1-s2 (e.g., outputs E1-E2) in FIG. 7. The MUX's coupled to nodes s1-s2 do not drive the nodes because they are disabled, so processing circuit 622 may detect the voltage induced on electrodes E1-E2 by reading the voltage at nodes s1-s2.

Nodes s0-s3 may include a high impedance (e.g., >1 megaohms, >10 megaohms, >100 megaohms) pull-down (not shown) so that electrodes that are not connected to a target are pulled to zero volts.

As discussed above, assume that VLOW is 10 volts and VHIGH is 100 volts. The tissue of a body is similar to a resistive load. The voltage difference between VHIGH and VLOW is dropped across the target tissue between the electrodes E0 and E3. If electrodes E1-E2 are positioned in target tissue between or near electrodes E0 and E3, the voltage of target tissue at electrodes E1-E2 will lie somewhere between VHIGH and VLOW. If the voltage detected at nodes s1-s2 lies in the range of VLOW to VHIGH, then the electrode coupled to that node, electrodes E1-E2 respectively, is electrically coupled to target tissue. If processing circuit detects a voltage on nodes s1-s2 that lies in the range of VLOW to VHIGH, then processing circuit 622 knows that that the corresponding electrode is electrically coupled to target tissue. If the voltage on node s1 or node s2 lies outside of the range of VLOW to VHIGH, most likely zero volts, then processing circuit 622 knows that the corresponding electrode is not electrically coupled to target tissue.

Any two electrodes may be assigned to provide the voltages VLOW and VHIGH respectively (e.g., refer to row 1832) and the other nodes may be tested for electrical connectivity to the target.

Processing circuit may also drive the inputs of selector circuit 700 to provide VTN and VTP to two electrodes to test the connectivity of the electrodes by discharge of capacitors as discussed above. Row 1834 of Table 1800 shows the input values for steering voltage VTP to electrode E2 and VTN to electrode E0 while row 1836 shows the input values for steering voltages VTP and VTN to electrodes E1 and E3 respectively.

Processing circuit 622 may store the results of testing with respect to selector circuit 700 (e.g., in a memory). Processing circuit 622 may use test results, whether a current test (e.g., VTP, VTN) or a voltage test (e.g., VHIGH, VLOW) to identify pairs of electrodes for providing the stimulus signal through the target.

Processing circuit 622 may use the results of testing to select electrodes for providing signals to target tissue. Processing circuit 622 may use the results of testing to determine a polarity assignment.

Figures 19A, 19B:
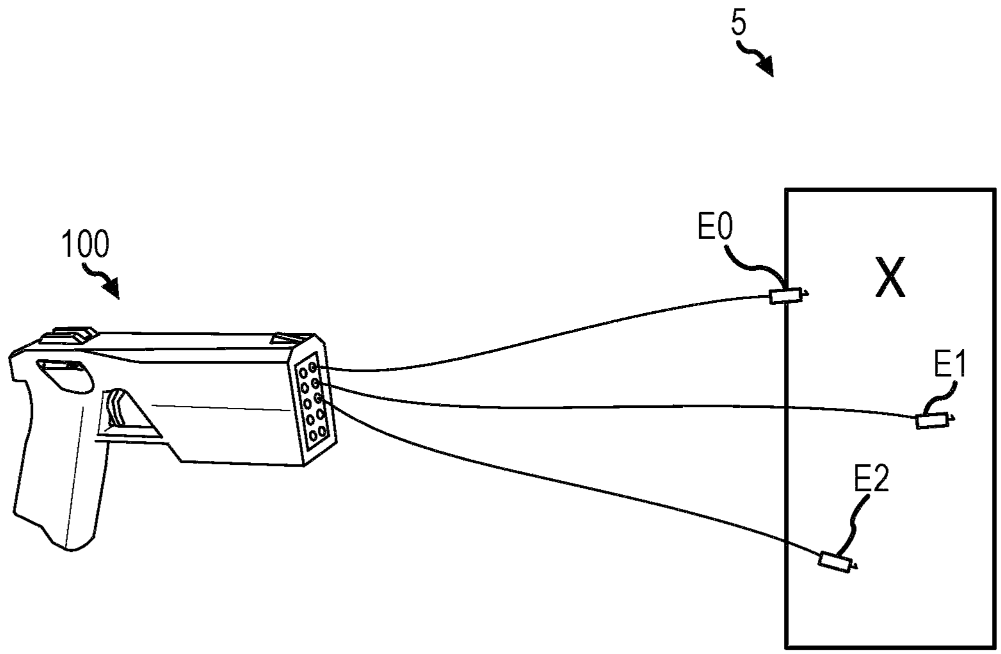
FIG. 19A is a view of electrodes deployed from a CEW, in accordance with various embodiments.
FIG. 19B is a table of example polarity assignments for the electrodes of FIG. 19A, in accordance with various embodiments.

As an example, in accordance with various embodiments and with reference to FIG. 19A, a CEW 100 is depicted after deploying at least three electrodes (e.g., a first electrode E0, a second electrode E1, a third electrode E2) towards a target 5. As depicted, electrodes E0, E1, and E2 are all coupled to target 5. A pair of electrodes from electrodes E0, E1, E2 may be configured to provide a stimulus signal (e.g., via a signal generator of CEW 100) through target 5. Pairs of different electrodes from electrodes E0, E1, E2 may also be configured to provide alternating pulses of the stimulus signal through target 5. CEW 100 may alternate or change which electrode from a given pair of electrodes provides the negative potential and/or positive potential of a pulse of a stimulus signal.

For example, in accordance with various embodiments and with reference to FIGS. 19A and 19B, a Table 1900 depicts an exemplary provision of a negative potential ("−") and a positive potential ("+") during pulses of a stimulus signal. For example, CEW 100 may provide a first pulse (PULSE 1) of a stimulus signal through target 5 via first electrode E0 and second electrode E1. Third electrode E2 may be disconnected during the first pulse (e.g., decoupled from the signal generator so that third electrode E2 does not provide the first pulse of the stimulus signal through the target). During the first pulse, first electrode E0 may provide the negative potential of the first pulse and second electrode E1 may provide the positive potential of the first pulse.

CEW 100 may provide a second pulse (PULSE 2) of the stimulus signal through target 5 via second electrode E1 and third electrode E2. First electrode E0 may be disconnected during the second pulse (e.g., decoupled from the signal generator so that first electrode E0 does not provide the second pulse of the stimulus signal through the target). During the second pulse, second electrode E1 may provide the negative potential of the second pulse and third electrode E2 may provide the positive potential of the second pulse.

CEW 100 may provide a third pulse (PULSE 3) of the stimulus signal through target 5 via third electrode E2 and first electrode E0. Second electrode E1 may be disconnected during the third pulse (e.g., decoupled from the signal generator so that second electrode E2 does not provide the third pulse of the stimulus signal through the target). During the third pulse, third electrode E2 may provide the negative potential of the third pulse and first electrode E0 may provide the positive potential of the third pulse. In embodiments with additional electrodes coupled to target 5 (e.g., a fourth electrode), the third pulse may be provided via third electrode E2 and the fourth electrode. In that regard, during the third pulse, third electrode E2 may provide the negative potential of the third pulse and the fourth electrode may provide the positive potential of the third pulse, and first electrode E0 and second electrode E1 may be disconnected during the third pulse (e.g., decoupled from the signal generator so that first electrode E0 and second electrode E2 do not provide the third pulse of the stimulus signal through the target).

CEW 100 may continue to provide subsequent pulses (PULSE n) of the stimulus signal through target 5 via different pairs of electrodes accordingly.

In various embodiments, CEW 100 may provide repeated pulses of a stimulus signal without changing the accompanying potentials of one or more electrodes. For example, prior to providing the second pulse of the stimulus signal CEW 100 may provide a repeated pulse of the stimulus signal through target 5 via first electrode E0 and second electrode E1. During the repeated pulse, first electrode E0 may still provide the negative potential of the repeated pulse and second electrode E1 may still provide the positive potential of the repeated pulse. In various embodiments, a repeated pulse may include a plurality of pulses of the stimulus signal.

In various embodiments, CEW 100 may determine a state of connection of one or more electrodes E0, E1, E2 before providing a pulse of the stimulus signal through an electrode E0, E1, E2. The state of connection may indicate whether an electrode E0, E1, E2 is electrically coupled to target 5. In response to the state of connection of an electrode being "not connected" (or a representation of not connected), CEW 100 may not provide the pulse of the stimulus signal through that electrode. In response to the state of connection of an electrode being "connected" (or a representation of connected), CEW 100 may select that electrode to provide the pulse of the stimulus signal.

As previously discussed herein, a signal generator, a selector circuit, and/or a processing circuit may be configured to control provision of the negative potential and the positive potential to electrodes during pulses of the stimulus signal. For example, a selector circuit may be configured to selectively provide the positive potential and the negative potential to the plurality of electrodes based on operation by the processing circuit. As a further example, a signal generator may comprise a first conductor and a second conductor. The first conductor may have a positive potential and the second conductor may have a negative potential. A selector circuit in electrical series between the signal generator and the electrodes E0, E1, E2 may be configured to selectively electrically couple any electrode from electrodes E0, E1, E2 to the first conductor or the second conductor of the signal generator. Selectively electrically coupling electrodes to the conductors may allow CEW 100 to change a polarity of an electrode during pulses of the stimulus signal.

A selector circuit may comprise one or more multiplexors, one or more relays, and/or one or more relays and an h-bridge. The one or more multiplexors, the one or more relays, and/or the one or more relays and the h-bridge may be configured to allow the selector circuit to selectively electrically couple the electrodes to the conductors, as discussed further herein.

In various embodiments, and as previously discussed herein, electrodes E0, E1, E2, etc. may be deployed from a single cartridge or one or more cartridges. For example, a housing of CEW 100 may define a bay. A plurality of cartridges may be insertable within the bay of the housing. Each cartridge of the plurality of cartridges may comprise one electrode from the launched electrodes (e.g., a first cartridge comprises first electrode E0, a second cartridge comprises second electrode E1, etc.).

Figures 20A, 20B:
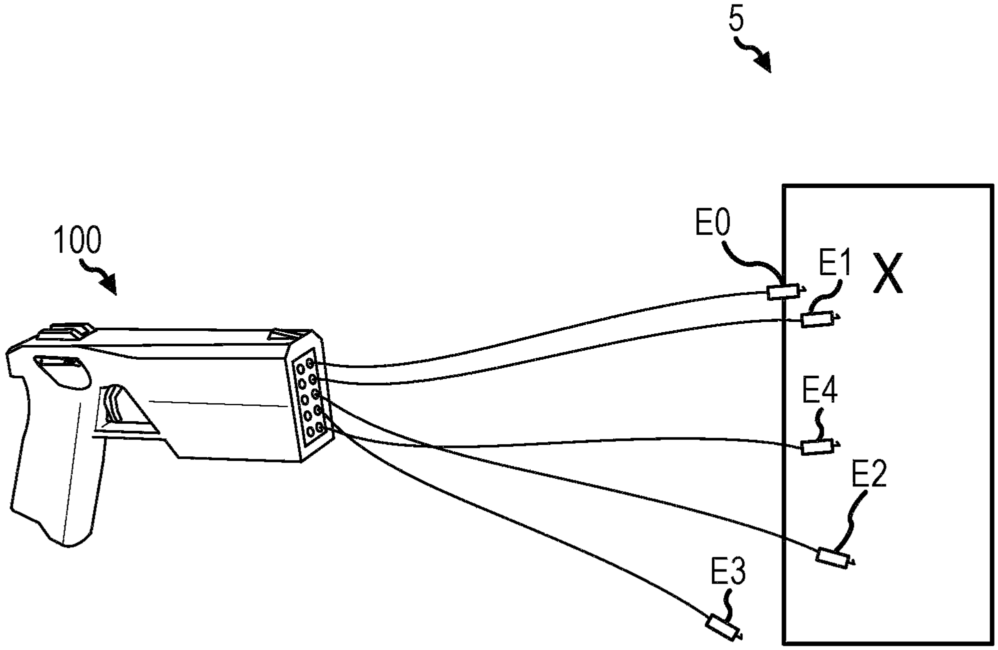
FIG. 20A is a view of electrodes deployed from a CEW, in accordance with various embodiments.
FIG. 20B is a table of example test measurements for the electrodes of FIG. 20A, in accordance with various embodiments.

As another example, in accordance with various embodiments and with reference to FIG. 20A, a CEW 100 is depicted after deploying at least five electrodes (e.g., a first electrode E0, a second electrode E1, a third electrode E2, a fourth electrode E3, a fifth electrode E4) towards a target 5. As depicted, electrodes E0, E1, E2, E4 are coupled to target 5, and electrode E3 is not coupled to target 5 (e.g., a missed deployment). An electrode not coupled to a target is unable to provide a stimulus signal through the target. Testing electrical connectivity of launched electrodes may allow CEW 100 to determine a state of connection of each electrode and determine whether each electrode is able to provide a stimulus signal through the target. Testing electrical connectivity of launched electrodes may also allow CEW 100 to determine a relative distance between electrodes coupled to the target (e.g., dart spread, electrode spread, etc.). A greater distance between electrodes providing the stimulus signal may increase the likelihood of inducing NMI on the target.

CEW 100 (e.g., via a signal generator) may be configured to apply test signals on launched electrodes to test the electrical connectivity of the electrode. For example, CEW 100 may apply a first test signal (e.g., a first voltage) on a first electrode and a second test signal (e.g., a second voltage) on a second electrode. The first test signal may comprise a first voltage and the second test signal may comprise a second voltage different from the first voltage.

CEW 100 may detect a measurement voltage of each of the remaining electrodes to determine the state of connection of each of the remaining electrodes (wherein each of the remaining electrodes is not provided a test signal). The measurement voltage may inform the state of connection, as discussed further herein. For example, because each of the remaining electrodes coupled to the same target share electrical coupling with the first electrode (provided the first test signal) and/or the second electrode (provided the second test signal), the measurement voltage of a remaining electrode coupled to the target should be greater than 0 volts (e.g., a same voltage as the first test signal, a same voltage as the second test signal, a voltage between the first test signal and the second test signal, etc.). Because each of the remaining electrodes not coupled to the same target do not share electrical coupling with the first electrode (provided the first test signal) and the second electrode (provided the second test signal), the measurement voltage of a remaining electrode not coupled to the same target should be 0 volts (or close to 0 volts).

For example, a CEW may deploy at least three electrodes towards a target. The CEW may apply a first voltage to a first electrode of the at least three electrodes and a second voltage to a second electrode of the at least three electrodes. The first voltage may be greater than the second voltage. The CEW may detect (e.g., measure, receive, etc.) a measurement voltage at a remaining electrode from the at least three electrodes deployed towards the target.

The CEW may determine a state of connection based on the measurement voltage. For example, in response to the measurement voltage being 0 volts, the state of connection of the third electrode is "not connected" (or a representation of not connected) (e.g., the third electrode is not coupled to the target). In response to the measurement voltage being a value equal to the first voltage, equal to the second voltage, or between the first voltage and the second voltage, the state of connection of the third electrode is "connected" (or a representation of connected) (e.g., the third electrode is coupled to the target). In response to the measurement voltage being a value numerically closer to the first voltage than the second voltage, the third electrode may be coupled to the target at a location on the target closer to the first electrode than the second electrode (e.g., the first electrode is coupled at a first location, the second electrode is coupled at a second location, the third electrode is coupled at a third location, and the third location is closer to the first location than the second location). In response to the measurement voltage being a value numerically closer to the second voltage than the first voltage, the third electrode may be coupled to the target at a location on the target closer to the second electrode than the first electrode (e.g., the first electrode is coupled at a first location, the second electrode is coupled at a second location, the third electrode is coupled at a third location, and the third location is closer to the second location than the first location). In response to the measurement voltage being a value that is the same (or about the same) as the first voltage, the state of connection of the second electrode is "not connected" (or a representation of not connected) (e.g., the first electrode and the third electrode are coupled to the target, but the second electrode is not coupled to the target). In response to the measurement voltage being a value that is the same (or about the same) as the second voltage, the state of connection of the first electrode is "not connected" (or a representation of not connected) (e.g., the second electrode and the third electrode are coupled to the target, but the first electrode is not coupled to the target).

In various embodiments, a CEW may detect respective measurement voltages at multiple remaining electrodes at a same time. For example, the CEW may deploy at least four electrodes towards a target. The CEW may apply a first voltage of a test signal to a first electrode of the at least four electrodes and a second voltage of a second test signal to a second electrode of the at least four electrodes. The first voltage may be greater than the second voltage. The first voltage may be applied across the different first and second electrodes at a same time. In accordance with the test signals, the CEW may concurrently detect a first measurement voltage at a third electrode from the at least four electrodes and a second measurement voltage at a fourth electrode from the at least four electrodes. Accordingly, a plurality of measurement voltages may be determined for a plurality of electrodes in accordance with a same one or more test signals (e.g., same test signal or pair of test signals, etc.).

The CEW may determine an electrode spread between electrodes based on the state of connection and/or the measurement voltage. For example, and as previously discussed, in response to the measurement voltage being a value numerically closer to the first voltage than the second voltage, the third electrode may be coupled to the target at a location on the target closer to the first electrode than the second electrode (e.g., the first electrode is coupled at a first location, the second electrode is coupled at a second location, the third electrode is coupled at a third location, and the third location is closer to the first location than the second location). Because the third electrode is closer to the first electrode than the second electrode, a relative electrode spread between the three electrodes can be determined (e.g., a first electrode spread between the first electrode and the second electrode is greater than a second electrode spread between the first electrode and the third electrode). As can be extrapolated by one skilled in the art, additional tests, measurement voltages, and states of connection may further determine and refine locations of the electrodes on the target, and the relative electrode spread between electrodes on the target.

As discussed, the first voltage and the second voltage applied as test signals may comprise different values. For example, the first voltage may be greater than the second voltage, or the second voltage may be greater than the first voltage. The first voltage and the second voltage may each comprise low voltages. The first voltage and the second voltage may each be less than 50 volts. For example, the first voltage (or the second voltage) may be less than 5 volts and the second voltage (or the first voltage) may be greater than 10 volts. In some embodiments, the first voltage (or the second voltage) may be 3 volts and the second voltage (or the first voltage) may be 12 volts. In embodiments, a voltage difference between the first voltage and the second voltage may be one or more of less than ten volts, less than twenty volts, less than thirty volts, less than fifty volts, or less than one hundred volts. The voltage difference may comprise a difference of an absolute value of the first voltage and an absolute value of the second voltage.

In various embodiments, one or more measurement voltages and/or states of connection may be stored in memory of the CEW by a processing circuit. Storing the one or more measurement voltages and/or the states of connection in memory may allow CEW to further use the collected data for reporting, testing, or other processes or uses.

In accordance with various embodiments and with reference to FIGS. 20A and 20B, a Table 2000 depicts an exemplary application of a first test signal ("FIRST V") and a second test signal ("SECOND V") during a plurality of example tests. In Table 2000 use of the tilde identifier "~" may represent that the measurement voltage is close to, or closer to, a first test signal (e.g., ~FIRST V) than a second test signal, or that the measurement voltage is close to, or closer to, a second test signal (e.g., ~SECOND V) than a first test signal (wherein "closer to" as used in either context refers to a measured value being closer to a given value compared to a second value). In Table 2000 use of a bolded font may indicate the test signals applied during a given test (e.g., in TEST 1, FIRST V under electrode E0 and SECOND V under electrode E2 are bolded).

For example, CEW 100 may perform a first test (TEST 1) on the launched electrodes E0, E1, E2, E3, E4 by applying a first test signal (FIRST V) to first electrode E0 and a second test signal (SECOND V) to third electrode E2. During the first test, CEW 100 may detect a measurement voltage at second electrode E1, fourth electrode E3, and fifth electrode E4. As depicted in FIG. 20A, second electrode E01 is closer in location to first electrode E0 than to third electrode E2, so the detected measurement voltage should comprise a value closer to the first test signal than the second test signal (e.g., ~FIRST V); fourth electrode E3 is not coupled to target 5, so the detected measurement voltage is 0 volts (or close to 0 volts); and fifth electrode E4 is closer in location to third electrode E2 than to first electrode E0, so the detected measurement voltage should comprise a value closer to the second test signal than the first test signal (e.g., ~SECOND V).

The results (e.g., states of connection) of TEST 1 would indicate that electrodes E0, E1, E2, and E4 are electrically coupled to target 5, and fourth electrode E3 is not electrically coupled to target 5 (e.g., a state of connection of "not connected"). Further, CEW 100 may determine a relative electrode spread between the electrodes (e.g., electrode E0 has the greatest electrode spread with electrode E2 or E4, and electrode E2 has the greatest electrode spread with electrode E0 or E1).

For example, CEW 100 may perform a second test (TEST 2) on the launched electrodes E0, E1, E2, E3, E4 by applying a first test signal (FIRST V) to second electrode E1 and a second test signal (SECOND V) to fifth electrode E4. During the second test, CEW 100 may detect a measurement voltage at first electrode E0, third electrode E2, and fourth electrode E3. As depicted in FIG. 20A, first electrode E0 is closer in location to second electrode E1 than to fifth electrode E4, so the detected measurement voltage should comprise a value closer to (or the same as) the first test signal than the second test signal (e.g., ~FIRST V); third electrode E2 is closer in location to fifth electrode E4 than to second electrode E1, so the detected measurement voltage should comprise a value closer to (or the same as) the second test signal than the first test signal (e.g., ~SECOND V); and fourth electrode E3 is not coupled to target 5, so the detected measurement voltage is 0 volts (or close to 0 volts).

The results (e.g., states of connection) of TEST 2 would indicate that electrodes E0, E1, E2, and E4 are electrically coupled to target 5, and fourth electrode E3 is not electrically coupled to target 5 (e.g., a state of connection of "not connected"). Further, CEW 100 may determine a relative electrode spread between the electrodes (e.g., electrode E1 has the greatest electrode spread with electrode E2 or E4, and electrode E4 has the greatest electrode spread with electrode E0 or E1).

For example, CEW 100 may perform a third test (TEST 3) on the launched electrodes E0, E1, E2, E3, E4 by applying a first test signal (FIRST V) to third electrode E2 and a second test signal (SECOND V) to fifth electrode E4. During the third test, CEW 100 may detect a measurement voltage at first electrode E0, second electrode E1, and fourth electrode E3. As depicted in FIG. 20A, first electrode E0 is closer in location to fifth electrode E4 than to third electrode E2, so the detected measurement voltage should comprise a value closer to (or the same as) the second test signal than the first test signal (e.g., ~SECOND V); second electrode E1 is closer in location to fifth electrode E4 than to third electrode E2, so the detected measurement voltage should comprise a value closer to (or the same as) the second test signal than the first test signal (e.g., ~SECOND V); and fourth electrode E3 is not coupled to target 5, so the detected measurement voltage is 0 volts (or close to 0 volts).

The results (e.g., states of connection) of TEST 3 would indicate that electrodes E0, E1, E2, and E4 are electrically coupled to target 5, and fourth electrode E3 is not electrically coupled to target 5 (e.g., a state of connection of "not connected"). Further, CEW 100 may determine a relative electrode spread between the electrodes (e.g., electrode E2 has the greatest electrode spread with one of electrodes E0, E1, or E2).

For example, CEW 100 may perform a fourth test (TEST 4) on the launched electrodes E0, E1, E2, E3, E4 by applying a first test signal (FIRST V) to fourth electrode E3 and a second test signal (SECOND V) to second electrode E1. During the fourth test, CEW 100 may detect a measurement voltage at first electrode E0, third electrode E2, and fifth electrode E4. As depicted in FIG. 20A, first electrode E0 is electrically coupled to second electrode E1 (via target 5) and fourth electrode E3 is not coupled to target 5, so the detected measurement voltage should comprise a value that is the same (or close to the same) as the second test signal (e.g., SECOND V); third electrode E2 is electrically coupled to second electrode E1 (via target 5) and fourth electrode E3 is not coupled to target 5, so the detected measurement voltage should comprise a value that is the same (or close to the same) as the second test signal (e.g., SECOND V); and fifth electrode E4 is electrically coupled to second electrode E1 (via target 5) and fourth electrode E3 is not coupled to target 5, so the detected measurement voltage should comprise a value that is the same (or close to the same) as the second test signal (e.g., SECOND V).

The results (e.g., states of connection) of TEST 4 would indicate that electrodes E0, E1, E2, and E4 are electrically coupled to target 5, and fourth electrode E3 is not electrically coupled to target 5 (e.g., a state of connection of "not connected").

In various embodiments, a CEW may perform tests by applying test signals in any desired or structured order, and may perform as many tests as desired or necessary to test each launched electrode.

In various embodiments, a CEW may perform tests between pulses of a stimulus signal, between deployment of additional electrodes, and/or at any other time as desired. For example, a CEW may apply a first test signal and a second test signal to determine a first state of connection of launched electrodes (e.g., as previously discussed). After applying the first test signal and the second test signal, the CEW may provide a first pulse of a stimulus signal through a first pair of launched electrodes. The CEW may then apply a third test signal and a fourth test signal to determine a second state of connection of launched electrodes (e.g., as previously discussed). After applying the third test signal and the fourth test signal, the CEW may provide a second pulse of the stimulus signal through a second pair of launched electrodes. The second pair of launched electrodes may be the same as the first pair of launched electrodes. The second pair of launched electrodes may be different from the first pair of launched electrodes (e.g., completely different, at least one electrode of the pair different, etc.). The first pair of launched electrodes may be based on the first state of connection (e.g., the first pair may include two electrodes coupled to the target, based on a determined electrode spread, etc.). The second pair of launched electrodes may be based on the second state of connection and/or the first state of connection (e.g., the first pair may include two electrodes coupled to the target, based on a determined electrode spread, etc.).

Figure 21:
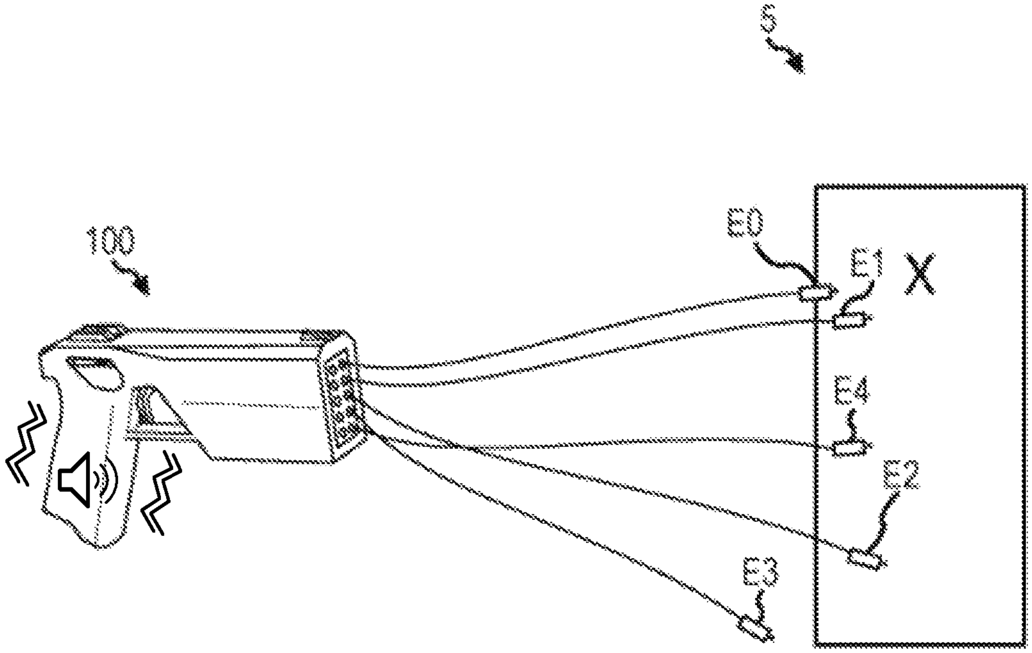
FIG. 21 is a view of electrodes deployed from a CEW causing an alert by the CEW, in accordance with various embodiments.

FIG. 21 is a view of electrodes deployed from a CEW causing an alert by the CEW, in accordance with various embodiments. As in the embodiment discussed in conjunction with FIG. 20A, a CEW 100 is depicted after deploying at least five electrodes (e.g., a first electrode E0, a second electrode E1, a third electrode E2, a fourth electrode E3, a fifth electrode E4) towards a target 5. As depicted, electrodes E0, E1, E2, E4 are coupled to target 5, and electrode E3 is not coupled to target 5 (e.g., a missed deployment). An electrode coupled to a target is able to provide a stimulus signal through the target (i.e., electrically coupled). An electrode not coupled to a target is unable to provide a stimulus signal through the target (i.e., not electrically coupled). Testing electrical connectivity of launched electrodes may allow CEW 100 to determine a state of connection of each electrode, e.g., a connection status of each electrode. The connection status may comprise whether a respective electrode is electrically coupled or not electrically coupled to the target such that a stimulus signal may or may not be provided from CEW 100 and the target. The connection status may be detected by a processor communicatively coupled with one or more deployed electrodes. For example, processing circuit 135 or 622 may be communicatively coupled with deployed electrodes such that a connection status between the deployed electrodes and a target may be detected by processing circuit 1135 or 662 with brief reference to FIGS. 1 and 6. Detecting a connection status may be performed in accordance with a test operation performed by the processor. For example, a connection status may be detected responsive to a test voltage being provided to deployed electrodes as discussed elsewhere herein.

In embodiments, a connection status may indicate a detected connection status for a single, respective electrode. The connection status may indicate whether an individual electrode is electrically coupled or not electrically coupled to a target. For example, CEW 100 may detect a connection status for first electrode E0. The connection status may be determined in accordance with a test performed separately for each deployed electrode as discussed above. The connection status may be distinct from a connection status of another electrode different from the individual electrode. For example, a first connection status of first electrode E0 may be independent of a second connection status of third electrode E2. Each individual electrode deployed from a CEW may have an associated connection status. For example, in the example deployment of FIG. 21, CEW 100 may detect a positive connection status (e.g., a successful deployment, an electrical coupling between CEW 100 and target 5, etc.) for each electrode of electrodes E0, E1, E2, E4 and a negative connection status (e.g., a missed deployment, a lack of electrical coupling between CEW 100 and target 5, etc.) for electrode E3. The example deployment in FIG. 21 is merely for purposes of illustration. In other deployments of CEW 100, a different connection status may be determined for each of electrodes E in accordance with a manner in which each electrode is deployed relative to a target. For example, in another example deployments, first electrode E0 may be detected to have a negative connection status and fourth electrode E3 may be detected to have a positive connection status when the deployment of first electrode E0 and fourth electrode E3 results in first electrode E0 not being electrically coupled with a target and fourth electrode E3 being electrically coupled to the target.

In embodiments, a connection status may be detected for each deployed electrode. A number of connection statuses detected may vary in accordance with a number of deployed electrodes. A number of connection statuses may be detected for a greater or lesser number of electrodes in accordance with a corresponding number of electrodes deployed. For example, a positive or negative connection status may be determined for each of electrodes E0, E1, and E2, when only electrodes E0, E1, and E2 and not electrodes E3-E4 have been deployed from CEW 100. In some example deployments, the connection status for at least three deployed electrodes of electrodes E may comprise a negative connection status for at least one electrode of the at least three deployed electrodes. As further discussed below, an alert and/or different alerts may be generated in accordance with the connection statuses of electrodes E, including when at least one deployed electrode of electrodes E comprises a negative connection status, as well as when at least two deployed electrodes of electrodes E each comprise a positive connection status.

With brief reference to FIG. 2, CEW 100 may comprise a user interface such as user interface 114. The user interface may comprise one or more alert devices. The one or more alert devices may be, for example, an audio device, a haptic device, and/or a light device. In embodiments, CEW 100 may generate one or more alerts via the one or more alert devices.

In embodiments, CEW 100 generates one or more alerts responsive to detection of a connection status of at least one electrode. For example, CEW 100 may generate an alert responsive to detection of a first connection status of second electrode E1. The at least one electrode may comprise more than one electrode. For example, CEW 100 may generate one or more alerts responsive to detection of a first connection status of second electrode E1 and a second connection status of third electrode E2. Alternately or additionally, CEW 100 may generate one or more alerts responsive to the first connection status of second electrode E1, the second connection status of third electrode E2, and a third connection status of fourth electrode E3.

In embodiments, CEW 100 may generate one or more alerts responsive to detecting a connection status for each electrode of a plurality of electrodes. For example, CEW 100 may generate a first alert of the one or more alerts responsive to detecting the first connection status of second electrode E1 and a second alert of the one or more alerts responsive to detecting the second connection status of third electrode E2. The plurality of electrodes may be deployed at different times. For example, two or more electrodes of the plurality of electrodes may be deployed sequentially. Accordingly, CEW 100 may detect a connection status for respective electrodes of the plurality of electrodes at different times. CEW 100 may further generate a plurality of alerts at the different times. For example, CEW 100 may generate the first alert at a first time responsive to detecting the first connection status of second electrode E1 and a second alert at a second, subsequent time responsive to detecting the second connection status of third electrode E2.

In some embodiments, CEW 100 may generate one or more alerts responsive to at least one electrode being deployed. Each alert of the one or more alerts may indicate a change in electrical coupling between CEW 100 and a target provided by the deployed electrode. For example, a first alert may be generated after second electrode E1 is deployed and a second alert may be generated after third electrode E2 is deployed. The first alert and the second alert may comprise a same or different alert in accordance with a same or different connection status detected for each of the second electrode E1 and third electrode E2 and/or one or more alert settings applied to CEW 100.

In embodiments, one or more alerts may be generated responsive to a minimum number of electrodes of a plurality of electrodes being deployed. The minimum number may be greater than one electrode. An alert of the one or more alerts may not be generated until the minimum number of electrodes has been deployed. For example, for a minimum number of three electrodes, an initial alert of the one or more alerts may not be generated until after first electrode E0, second electrode E1, and third electrode E2 have been deployed from CEW 100. The minimum number of electrodes may comprise two electrodes, three electrodes, four electrodes, or more than four electrodes. An alert may be generated individually for each respective electrode after the minimum number of electrodes is deployed. For example, for a minimum number of two electrodes, an individual alert may be generated after each of electrodes E1, E2, E3, and E4 are deployed.

In some embodiments, an alert of the one or more alerts may be generated in accordance with a detected connection status. As discussed above, the detected connection status may comprise either a positive connection status or a negative connection status. For example, a first alert may be generated when second electrode E1 is detected to have a positive connection status. Another alert, different from the first alert, may be generated when second electrode E1 is detected to have a negative connection status. The second alert may comprise a different intensity, frequency, combination of activated alert devices, and/or other differences relative to the first alert. An alert of the one or more alerts may be generated in accordance with the detected connection status for a plurality of deployed electrodes. For example, the first alert or the second alert may be generated in accordance with a detected for each of electrodes E1, E2, E3, E4 in the example deployment of FIG. 21. The first alert may be generated in accordance with the detected positive connection status of each of E1, E2, and E4, while the second alert may be generated responsive to the detected negative connection status of fourth electrode E3. In some embodiments, an alert may not be generated when a negative connection status is detected. For example, no alert may be generated when second electrode is detected to have a negative connection status. In other embodiments, no alert may be generated when a positive connection status is detected, but an alert of the one or more alerts may be generated when a negative connection status is detected.

In some embodiments, an alert of the one or more alerts may be generated in accordance with a detected connection status for each electrode after two or more electrodes are deployed. As discussed above, and in some embodiments, detecting a connection status for an individual electrode may require at least two electrodes to be coupled to a target such that a test voltage may be delivered via the at least two electrodes. A processor of CEW 100 may detect the connection status of each deployed electrode starting with a second electrode of a plurality of deployed electrodes. In some embodiments, responsive to the detected connection statuses, the processor may generate an individual alert indicating the detected connection statuses of the most recently deployed electrode. The individual alert may indicate whether the most recently deployed electrode is detected to be electrically coupled or not electrically coupled to a target. In some embodiments, an individual alert may be generated in accordance with only one of a positive or negative connection status. For example, CEW 100 may generate a series of alerts in accordance with a positive connection status by each of a plurality of electrodes (e.g., three alerts in accordance with positive connection statuses for each of electrodes E1, E2, E4, but no alert for electrode E3). In accordance with the alerts, a user of CEW 100 may identify a reference number of electrodes coupled to a target and, based in this information determine whether an additional electrode should be deployed toward the target in order to remotely deliver a stimulus signal from CEW 100.

In some embodiments, one or more alerts may be generated in accordance with a combination of detected connection statuses of a plurality of electrodes. The combination of detected connection statuses may comprise a number of predetermined connection statuses. For example, an alert of the one or more alerts may be generated in accordance with two or more connection statuses, three or more connection statuses, four or more connection statuses, or more than four connection statuses. For example, an alert may be generated in accordance with a combination of three electrodes E0-E2, four electrodes E0-E3, or five electrodes E0-E4 according to various aspects of the present disclosure. In some embodiments, when a number of electrodes less than a number associated with the combination of connection statuses has been deployed, no alert may be generated. For example, CEW 100 may not generate an alert via a user interface when only electrode E0 has been deployed.

In embodiments, an alert of the one or more alerts generated for a combination of detected connection statuses may indicate the specific connection statuses of the detected connection statuses. In some embodiments, the alert indicate that all electrodes have a positive connection status, all electrodes have a negative connection status, or all electrodes collectively have a combination of positive and negative connection statuses. For example, a first alert may be generated in accordance with each of electrodes E0-E2 having a positive connection status prior to fourth electrode E3 being deployed. After fourth electrode E3 is deployed and the combination of connection statuses for electrodes E0-E3 changes, a second alert different from the first alert may be generated in order to indicate that at least one electrode of the deployed electrode has a different (i.e., negative) connection status relative to connection statuses of other deployed electrodes. The combination of detected connection status may provide indication of an overall extent of electrical coupling between a CEW and a target, including when electrodes of the plurality of electrodes are launched from the CEW at different times.

In some embodiments, one or more alerts may be generated in accordance with a combination of detected connection statuses that comprise a threshold number of specific connection statuses. The threshold number of connection statuses may comprise a threshold number of positive or negative connection statuses for deployed electrodes. For example, a first alert may be generated in accordance with at least two deployed electrodes being detected to have a positive connection status. In the example deployment of FIG. 21, CEW 100 may generate a first alert in accordance with each of first electrode E0 and second electrode E1 having a respective positive connection status. The threshold number may comprise two electrodes, three electrodes, four electrodes, or more than four electrodes in embodiments according to various aspects of the present disclosure. The alert may be generated independent of additional connection statuses detected while the threshold number is detected. For example, a same alert may be generated in accordance with subsequent serial deployment of third electrode E2 and fourth electrode E3 while at least two positive connection statuses are detected in accordance with first and second electrodes E0-E1 and a threshold number of at least two positive connection statuses. In other embodiments, threshold number(s) for generating a respective alert of the one or more alerts may be associated with a threshold number of negative connection statuses or threshold numbers of both positive and negative connection statuses detected for a plurality of deployed electrodes.

In some embodiments, different alerts may be generated in accordance with different threshold numbers of detected connection statuses. The different alerts may indicate that an increased number of electrodes are electrically coupled to a target in accordance with an increase in numbers between the different threshold numbers. For example, a first alert may be generated in accordance with a first threshold number of two positive connection statuses when first electrode E0 and second electrode E1 are detected to each have a positive connection status. Further, and in accordance with a second threshold number of three positive connection statuses, a second, different alert may be generated when first electrode E0, second electrode E1, and third electrode E2 are detected to each have a positive connection status. In accordance with various aspects of the present disclosure, CEW 100 may generate one or more alerts in accordance with various, respective combination(s) of positive and/or negative connection statuses so as to provide useful information to a user of CEW 100 regarding an overall connection status between CEW 100 and a target via two or more deployed electrodes.

In some examples, CEW 100 may generate an alert for one or more pairs of connected electrodes. For example, a connection status for which an alert may be generated by comprise at least one pair of connected electrodes (e.g., positively connected electrodes), two pairs of connected electrodes, or more than two pairs of connected electrodes. Each pair of the two or more pairs may comprise one same electrode or no common electrodes. The alert may comprise a same or different alert for each connection status associated with the one or more pairs of electrodes. Each pair of connected electrodes may enable a stimulus signal to be provided to a target. Accordingly, an alert indicating each pair of connected electrodes and/or a number of connected pairs of electrodes may indicate an extent of coupling between CEW 100 and a target to provide a stimulus signal from CEW 100 to the target.

In embodiments, one or more alerts may be one or more of a haptic alert, an audible alert, or a visible alert. A haptic alert may comprise a vibration or series of vibrations of one or more portions of CEW 100. The haptic alert may be perceivable via an unaided human sensory system disposed in physical contact with CEW 100. In some embodiments, a haptic alert may comprise one or more intensity settings based at least in part on connection status of at least one electrode, e.g., such that haptic alert generates a high intensity vibration to a handle of CEW 100 responsive to a plurality of positive connection statuses. Different haptic alerts may comprise different vibration intensities. In some embodiments, haptic alert is generated by a haptic feedback device integrated with CEW 100. A user interface of CEW 100 may comprise the haptic feedback device or haptic device. An audible alert may comprise any audio alert, e.g., a sound or series of sounds perceivable via an unaided human hearing system. The sound or one or more sounds may include beeps, alarms, and/or verbal alerts. In some embodiments, audible alert may comprise one or more volume settings. Volume settings may be based at least in part on connection status of at least one electrode. In some examples, volume settings may additionally or instead be based at least in part on a user input or adjustment. Different audible alerts may comprise different sounds provided with different frequencies, content (e.g., different words), and/or different volume settings. For example, a first tone provided at a lower volume setting may indicate a negative connection status or other first combination of one or more connection statuses, while a second tone provided at a higher volume setting relative to the lower volume setting may indicate a positive connection status or another second combination of one or more connection statuses different from the first combination. The second tone may comprise a same or different frequency as the first tone. A visible alert may comprise a visual effect perceivable via an unaided human vision system. For example, a visible alert may comprise a light emitting diode (LED) or other light source of a user interface of CEW 100 turning on, turning off, or flashing; words, symbols, or other characters appearing on an electronic display of a user interface of CEW 100.

In some embodiments, CEW 100 may detect one or more other event types and may additionally generate alerts for the one or more other event types. The other event types may be distinct from a connection status of each electrode of one or more electrodes E of CEW 100. The other event types may be determined independently from detection of each of one or more connection statuses of one or more electrodes of CEW 100. CEW 100 may use same or different alert devices to generate alerts for the other event types. For example, CEW 100 may generate alerts via an audio device, a haptic device, and/or a light device for the other event types. The event types may comprise one or more of a low battery; a CEW error; a battery error; cartridge error; an automatic shutdown of CEW; arc warning safety switch and/or trigger activation; deployment of one or more electrodes; removal of CEW from holster; and the like. In various embodiments, CEW 100 may include one or more sensors or systems for detecting other event types, such as, for example, gyroscopes configured to detect motion by CEW 100 or hall effect sensors or other magnetic field sensors configured to detect when CEW 100 is in proximity to other items, e.g., holsters, other CEWs, or other weapons. In some embodiments, the one or more other event types may correspond to different alert types and/or alert settings. For example, the one or more other event types may correspond to or be indicated by one or more of: a quieter or louder audible alert; an audible alert comprising a different note, verbal alert, or tone; a more or less intense vibration/haptic alert; a different series of vibrations/haptic alerts; a brighter, dimmer, or differently colored light/visible alert; a visible alert comprising different words, symbols, or characters displayed on an electronic display; or the like.

Figure 22:
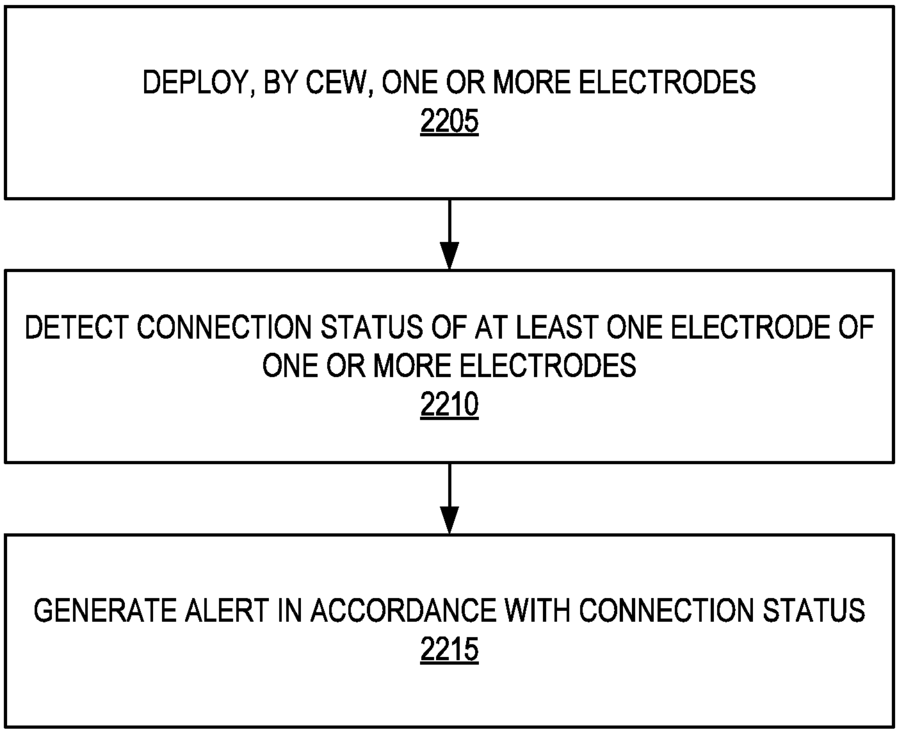
FIG. 22 is a flow diagram of an example method for generating alerts in accordance with connection status by a CEW, in accordance with various embodiments.

FIG. 22 is a flow diagram of an example method for generating alerts in accordance with connection status by a CEW, in accordance with various embodiments. CEW 100 comprises a user interface 114 comprising one or more alert devices with brief reference to FIG. 2. The one or more alert devices may comprise, for example, an audio device, a haptic device, and/or a light device. In some embodiments, CEW 100 detects and generates alerts for a plurality of event types. Event types may comprise, for example, one or more of: low battery; CEW errors; battery errors; magazine or cartridge errors; automatic shut down of CEW; arc warning; safety switch and/or trigger activation; deployment of one or more electrodes; connection status of one or more electrodes; removal of CEW from holster; and the like. Alerts may comprise one or more of an audible alert, a haptic alert, or a visible alert.

In some embodiments, CEW 100 deploys 2205 one or more electrodes at a target. After deployment, CEW 100 may detect 2210 connection status of at least one electrode of the one or more deployed electrodes. In some embodiments, CEW 100 detects connection status based at least in part by performing an electrical connectivity test by the CEW. In other embodiments, CEW 100 may detect connection status based on one or more other methods, sensors, or the like. A positive connection status corresponds to an electrode of the one or more electrodes being coupled to the target. A negative connection status corresponds to an electrode of the one or more electrodes failing to couple to the target. For example, an electrode detected to have a negative connection status may have missed the target during deployment. In some embodiments, each electrode in a plurality of deployed electrodes may correspond to a respective connection status. In some embodiments, detecting the connection status comprises detecting a number of positive connection statuses or negative connection statuses for at least two electrodes deployed from the CEW. CEW 100 generates 2215 an alert in accordance with connection status of at least one electrode of the deployed electrodes. In some embodiments, responsive to at least one electrode having a positive connection status, CEW 100 generates a positive connection alert. In other embodiments, responsive to at least one electrode having a negative connection status, CEW 100 generates a negative connection alert. In other embodiments, responsive to a threshold number of deployed electrodes having a positive connection status, CEW 100 generates a positive connection alert. In other embodiments, CEW 100 generates different and/or subsequent alerts in accordance with a number of positive and/or negative connections, e.g., a series of audible alerts based on a number of positive and/or negative connections; a number of symbols on an electronic display based on a number of positive and/or negative connections; an intensity of vibration based on a number of positive and/or negative connections; and the like. In other embodiments, other thresholds or values may be used to determine an alert type. Different met thresholds and/or detected connection statuses may be associated with different alerts such that indications provided via a user interface of CEW 100 may indicate the different thresholds and/or connections statuses to a user of CEW 100. In some embodiments, generating the alert may comprise generating the alert responsive to determining the number of positive connection statuses or negative connection statuses detected for electrodes deployed from CEW 100 is equal or greater than a threshold number of positive connection statuses or negative connection statuses. For, example, the number of detected positive connection statuses may be compared to a threshold number and, responsive to the number of detected positive connection statuses being equal or greater than the threshold number, the alert may be generated. Determining the number of detected positive connection statuses to be less than the threshold number may prevent or otherwise fail to cause the alert to be generated. Determining the number of detected positive connection statuses to be less than the threshold number may cause another, second alert to be generated, different from the alert or first alert generated when the number of detected positive connection statuses is equal or greater than the threshold. In embodiments, the threshold number may be two, three, or four positive or negative connection statuses.

In other embodiments, CEW 100 additionally comprises one or more communications interfaces, e.g., enabling WI-FI, BLUETOOTH, or other long- or short-distance wireless communications to other entities. CEW 100 may additionally or instead transmit and/or broadcast an alert or notification in accordance with connection status of at least one electrode of the deployed electrodes. For example, CEW 100 may additionally or instead enable a BLUETOOTH broadcast comprising a notification to one or more other entities, the notification identifying a connection status of one or more electrodes of the CEW. In another example, CEW 100 may additionally or instead establish a communications channel with one or more remote entities (e.g., a computing device or system of law enforcement) and may transmit, via the communications channel, a notification identifying a connection status of the one or more electrodes of the CEW.

In other embodiments, CEW 100 may additionally perform one or more actions responsive to connection status of at least one electrode of the deployed electrodes. For example, CEW 100 may enable one or more functions, disable one or more functions, modify one or more parameters, automatically start/stop/pause/resume one or more functions, and the like. For example, in some embodiments, generating an alert may comprise disabling deployment of one or more subsequent electrodes for a minimum period of time. The minimum period of time may comprise five seconds or alternately, in other embodiments, three seconds, greater than three seconds, or greater than five seconds. In accordance with disabling the deployment, the stimulus signal may be provided over previously deployed electrodes detected to be electrically coupled to a target, thereby preserving unlaunched electrodes for future uses of CEW 100 at a different incident. In some embodiments, the deployment may be disabled in accordance with a same or different combination of connection statuses for which an alert is generated. For example, a first alert may be generated in accordance with two electrodes being detected as having a positive connection status. The deployment of additional electrodes may not be disabled in accordance with this same detected connection status of two electrodes. In accordance with three or more electrodes being detected as having a positive connection status, a second alert may be generated, wherein the second alert is different from the first alert. In accordance with three or more electrodes being detected as having the positive connection status, the deployment of subsequent electrodes may be prevented for the minimum period of time.

In embodiments of FIG. 22, the method may be performed by a CEW 100. In other embodiments, the method may be performed in part or in whole by other entities. Further, in other embodiments, the method may comprise additional or fewer steps, and the steps may be performed in a different order than described in conjunction with FIG. 22.

Figure 23:
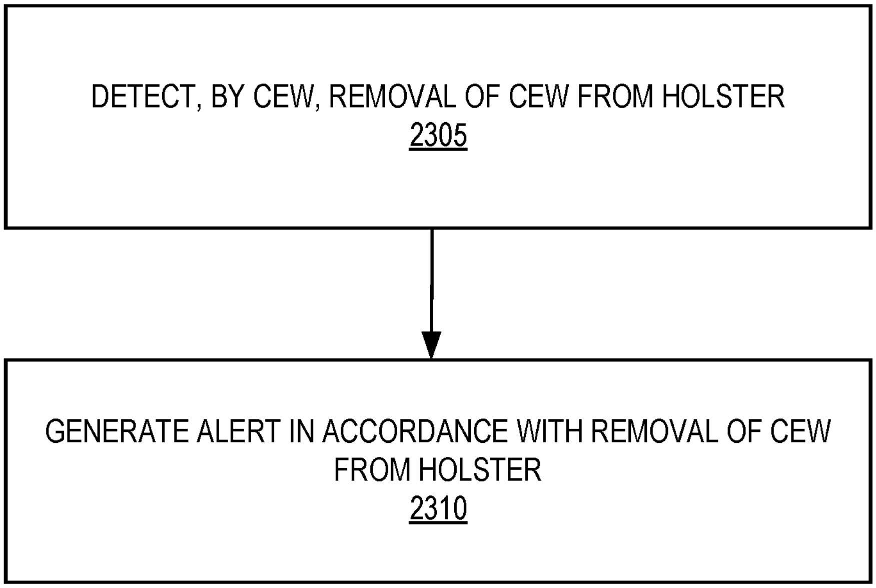
FIG. 23 is a flow diagram of an example method for generating alerts in accordance with a CEW being removed from a holster, in accordance with various embodiments.

FIG. 23 is a flow diagram of an example method for generating alerts in accordance with removal of a CEW from a holster, in accordance with various embodiments. In some embodiments, a CEW such as CEW 100 may be configured to perform operations of one or both operations of FIG. 22 and/or FIG. 23. CEW 100 comprises a user interface 114 comprising one or more alert devices. The one or more alert devices may be, for example, an audio device, a haptic device, and/or a light device. In various embodiments, the one or more alert devices may comprise a haptic feedback device. Alerts may comprise one or more of an audible alert, a haptic alert, or a visible alert.

In various embodiments, CEW 100 comprises at least one sensor or systems configured to detect removal of CEW 100 from a holster. For example, CEW 100 may comprises a gyroscope or other sensor configured to detect movement, direction of movement, and/or velocity of movement by the CEW 100. Alternately or additionally, CEW 100 may comprise a Hall effect sensor or other sensor configured to detect proximity to holster or other item having magnetic elements. In another example, CEW 100 may comprise one or more communications interfaces. The communications interface (s) may enable WI-FI, BLUETOOTH, or other long- or short-distance wireless communications to other entities, configured to interact with other entities within a given proximity, e.g., a smart watch. In another example, CEW 100 may comprise a fingerprint sensor or other sensor configured to detect touch on a portion, e.g., a handle, or all of the CEW 100.

CEW 100 detects 2305, based at least in part on the one or more sensors, removal of the CEW 100 from a holster. CEW 100 generates 2310 an alert in accordance with removal of the CEW 100 from the holster. The alert may be generated responsive to detection of the removal of CEW 100 from the holster. In some embodiments, responsive to detecting removal of the CEW 100 from the holster, CEW 100 generates a haptic alert. In some embodiments, the haptic alert is generated by the haptic feedback device. In other embodiments, the alert may be alternately or additionally generated by another alert device of a user interface of CEW 100.

In other embodiments, CEW 100 additionally comprises one or more communications interfaces. CEW 100 may additionally or instead transmit and/or broadcast an alert or notification in accordance with removal of the CEW 100 from the holster. For example, CEW 100 may additionally or instead enable a BLUETOOTH broadcast comprising a notification to one or more other entities, the notification identifying removal of the CEW 100 from the holster. In another example, CEW 100 may additionally or instead establish a communications channel with one or more remote entities (e.g., a computing device or system of law enforcement) and may transmit, via the communications channel, a notification identifying removal of the CEW 100 from the holster.

In other embodiments, CEW 100 may additionally perform one or more actions responsive to removal of the CEW from the holster. For example, CEW 100 may enable one or more functions, disable one or more functions, modify one or more parameters, automatically start/stop/pause/resume one or more functions, and the like.

In some embodiments, a method of providing an alert from a CEW is provided. The method may comprise detecting, by the CEW removal of the CEW from a holster. The removal may be detected via a sensor integrated with the CEW. The sensor may comprise a Hall effect sensor. The method may further comprise generating, by an alert device integrated with the CEW, an alert responsive to the detected removal. The alert device may comprise a haptic feedback device.

In some embodiments, a CEW configured to perform operations for providing an alert is provided. The operations may comprise detecting, via a sensor integrated with the CEW, removal of the CEW from a holster. The sensor may comprise a Hall effect sensor. The operations may further comprise generating, by an alert device integrated with the CEW, an alert in accordance with the detected removal. The alert device may comprise a haptic feedback device.

In embodiments of FIG. 23, the method may be performed by a CEW 100. In other embodiments, the method may be performed in part or in whole by other entities. Further, in other embodiments, the method may comprise additional or fewer steps, and the steps may be performed in a different order than described in conjunction with FIG. 23.

The foregoing description discusses implementations (e.g., embodiments), which may be changed or modified without departing from the scope of the present disclosure as defined in the claims. Examples listed in parentheses may be used in the alternative or in any practical combination. As used in the specification and claims, the words "comprising," "comprises," "including," "includes," "having," and "has" introduce an open-ended statement of component structures and/or functions. In the specification and claims, the words "a" and "an." are used as indefinite articles meaning "one or more." While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing," the barrel is not a claimed element of the apparatus, but an object that cooperates with the "housing" of the "apparatus" by being positioned in the "housing."

The location indicators "herein," "hereunder," "above," "below," or other word that refer to a location, whether specific or general, in the specification shall be construed to refer to any location in the specification whether the location is before or after the location indicator.

What is claimed is:

1. A conducted electrical weapon ("CEW") for deploying electrodes, the CEW configured to:
deploy at least three electrodes;
detect a connection status of each individual electrode of the at least three electrodes deployed from the CEW; and
generate, by an alert device integrated with the CEW, an alert in accordance with the connection status.

2. The CEW of claim 1, wherein the alert comprises one or more of: a haptic alert, an audible alert, or a visual alert.

3. The CEW of claim 1, wherein the CEW is further configured to generate, by the alert device integrated with the CEW, one or more additional alerts corresponding to one or more additional event types.

4. The CEW of claim 3, wherein the one or more additional event types comprise one or more of: a low battery; a battery error; a magazine or cartridge error; automatic shutdown of the CEW; an arc warning; a safety switch and/or trigger activation; deployment of an electrode; or removal of the CEW from a holster.

5. The CEW of claim 1, wherein the alert is generated when at least one electrode of the at least three electrodes comprises a negative connection status.

6. The CEW of claim 1, wherein one or more subsequent alerts are generated by the alert device in accordance with one or more additional connection statuses of one or more other electrodes.

7. The CEW of claim 1, wherein generating the alert comprises transmitting, via a communications interface of the CEW, a notification, the notification comprising information describing the connection status.

8. The CEW of claim 1, wherein the CEW is further configured to:
detect a change in connection status of at least one electrode of the at least three electrodes deployed from the CEW; and
generate, by the alert device integrated with the CEW, a second alert in accordance with the change in connection status.

9. The CEW of claim 8, wherein the change in connection status comprises a change from two electrically coupled electrodes to three electrically coupled electrodes, wherein the alert is generated in accordance with the two electrically coupled electrodes, and the second alert is different from the alert.

10. A method comprising:
detecting, by a conducted electrical weapon ("CEW"), a respective connection status of each electrode of a plurality of electrodes deployed from the CEW; and
generating, by an alert device integrated with the CEW, an alert in accordance with the respective connection status of each electrode of a plurality of electrodes, wherein a first respective connection status of a first electrode of the plurality of electrodes is distinct from a second respective connection status of a second electrode of the plurality of electrodes.

11. The method of claim 10, wherein the alert comprises at least one of: a haptic alert, an audible alert, or a visual alert.

12. The method of claim 11, wherein detecting the respective connection status of each electrode of the plurality of electrodes comprises detecting a number of positive connection statuses or negative connection statuses for at least two electrodes deployed from the CEW; and generating the alert comprises generating the alert responsive to determining the number of positive connection statuses or negative connection statuses is equal or greater than a threshold number of positive connection statuses or negative connection statuses.

13. The method of claim 10, wherein the CEW is further configured to generate, by the alert device integrated with the CEW, one or more additional alerts corresponding to one or more additional event types, wherein the one or more additional event types comprise one or more of: a low battery; a battery error; a magazine or cartridge error; an automatic shutdown of the CEW; an arc warning; a safety switch and/or trigger activation; deployment of an electrode; or removal of the CEW from a holster.

14. The method of claim 10, wherein the alert is generated responsive to the respective connection status of each electrode of the plurality of electrode.

15. The method of claim 10, wherein one or more subsequent alerts are generated by the alert device in accordance with one or more additional connection statuses of one or more other electrodes.

16. The method of claim 10, wherein generating the alert comprises transmitting, via a communications interface of the CEW, a notification, the notification comprising information describing the respective connection status of each electrode of the plurality of electrodes.

17. The method of claim 10, wherein generating the alert comprises establishing, by the CEW, a communications channel with a remote entity and transmitting, via the communications channel, a notification, the notification comprising information describing the respective connection status of each electrode of the plurality of electrodes.

18. The method of claim 10, further comprising:

detecting, by the CEW, a change in connection status of the plurality of electrodes deployed from the CEW; and generating, by the alert device integrated with the CEW, a second alert in accordance with the change in connection status, wherein the second alert is different from the alert generated in accordance with the connection status.

19. The method of claim 10, wherein the alert is generated when at least one electrode of the plurality of electrodes is not electrically coupled to a target.

20. The method of claim 12, wherein the threshold number of positive connection statuses or negative connection statuses comprises three positive or negative connection statuses.

* * * * *